(12) United States Patent
Gillot et al.

(10) Patent No.: US 9,338,663 B2
(45) Date of Patent: May 10, 2016

(54) METHOD AND SYSTEM FOR PROVIDING ROAMING INTELLIGENCE (RI) TO A HOST NETWORK OPERATOR FOR ITS ROAMING TRAFFIC

(75) Inventors: David Gillot, Brussels (BE); John Yue Jun Jiang, Danville, CA (US)

(73) Assignee: MOBILEUM, INC., Santa Clara, CA (US)

( * ) Notice: Subject to any disclaimer, the term of this patent is extended or adjusted under 35 U.S.C. 154(b) by 781 days.

(21) Appl. No.: 12/184,832

(22) Filed: Aug. 1, 2008

(65) Prior Publication Data

US 2009/0061854 A1    Mar. 5, 2009

Related U.S. Application Data

(63) Continuation-in-part of application No. 12/219,622, filed on Jul. 24, 2008, now Pat. No. 8,238,905, and a continuation-in-part of application No. 10/635,804, filed on Aug. 5, 2003, now Pat. No. 7,072,651, and a (Continued)

(51) Int. Cl.
*H04W 24/00* (2009.01)
*H04W 24/08* (2009.01)
*H04W 8/12* (2009.01)
*H04W 88/18* (2009.01)

(52) U.S. Cl.
CPC .............. *H04W 24/00* (2013.01); *H04W 8/12* (2013.01); *H04W 24/08* (2013.01); *H04W 88/18* (2013.01)

(58) Field of Classification Search
CPC ......... H04W 8/183; H04W 8/12; H04W 8/18; H04W 64/003; H04W 8/06; H04W 24/00; H04W 24/08; H04W 18/12; H04W 4/24; H04M 15/00; H04M 15/67; H04M 15/8038; H04M 15/41; H04M 15/90; H04M 15/50; H04M 15/58; H04M 2215/0188; H04M 2215/016; H04M 2215/52; H04M 2215/48; H04M 2215/7442; H04M 2215/0164; H04M 2215/2026; H04M 3/2218; H04M 17/00; H04Q 3/0087; H04Q 3/0025
USPC .................... 455/405, 408, 432.1, 435.2, 433
See application file for complete search history.

(56) References Cited

U.S. PATENT DOCUMENTS

| 7,408,942 B1 * | 8/2008 | Allahwerdi .................... 370/401 |
| 2004/0087305 A1 * | 5/2004 | Jiang et al. .................. 455/432.1 |
| 2005/0186939 A1 * | 8/2005 | Barnea et al. ................. 455/405 |
| 2006/0030333 A1 * | 2/2006 | Ward et al. .................. 455/456.1 |
| 2008/0020760 A1 * | 1/2008 | Elkarat et al. ................. 455/433 |
| 2010/0128685 A1 * | 5/2010 | Jiang ............................. 370/329 |

FOREIGN PATENT DOCUMENTS

| EP | 1469695 A1 * | 10/2004 | ............... H04Q 7/38 |
| EP | 1667484 A1 * | 6/2006 | ............... H04Q 7/34 |

*Primary Examiner* — George Eng
*Assistant Examiner* — Hung Du
(74) *Attorney, Agent, or Firm* — Arent Fox LLP

(57) ABSTRACT

The present invention provides a method for facilitating roaming management of a host network. The method includes obtaining at a gateway associated with the host network, signaling messages of one or more roamers. The roamers are subscribers of either the host network or one or more non-host networks. The method further includes determining by the gateway, the host network's roaming arrangement with the non-host networks, based on analysis of one or more signaling messages from the obtained signaling messages.

13 Claims, 7 Drawing Sheets

Related U.S. Application Data continuation-in-part of application No. 11/374,437, filed on Mar. 14, 2006, now Pat. No. 7,684,793, and a continuation-in-part of application No. 11/374,427, filed on Mar. 14, 2006, now Pat. No. 7,590,417, and a continuation-in-part of application No. 11/402,128, filed on Apr. 12, 2006, now Pat. No. 7,929,953, and a continuation-in-part of application No. 11/375,577, filed on Mar. 15, 2006, now abandoned, and a continuation-in-part of application No. 11/366,021, filed on Mar. 2, 2006, now Pat. No. 7,660,580, and a continuation-in-part of application No. 11/366,017, filed on Mar. 2, 2006, now Pat. No. 7,742,763, and a continuation-in-part of application No. 12/153,453, filed on May 19, 2008, now Pat. No. 8,583,109.

(60) Provisional application No. 60/935,223, filed on Aug. 1, 2007, provisional application No. 60/935,053, filed on Jul. 24, 2007, provisional application No. 60/658,258, filed on Mar. 2, 2005, provisional application No. 60/657,798, filed on Mar. 2, 2005, provisional application No. 60/924,525, filed on May 18, 2007.

METHOD AND SYSTEM FOR PROVIDING ROAMING INTELLIGENCE (RI) TO A HOST NETWORK OPERATOR FOR ITS ROAMING TRAFFIC

RELATED APPLICATIONS

This application claims the benefit of U.S. Provisional Patent Application No. 60/935,223 titled "Roaming Intelligence from Passive Monitoring and Active Signaling from Single Operator Perspective on Real Inbound and Outbound Roaming Traffic" filed Aug. 1, 2007. This application is also a continuation-in-part of U.S. application Ser. No. 12/219,622 titled "A Single Operation and Network Side Solution for Inbound and Outbound Roaming Tests and Discoveries of Roaming Partner Services and Frauds Without Involving Remote Probes or Real Roamer Traffic" filed Jul. 24, 2007, claiming priority to U.S. Provisional Application No. 60/935,053 titled filed Jul. 24, 2007. It is also a continuation-in-part of U.S. patent application Ser. No. 10/635,804 titled "Method And System For Cellular Network Traffic Redirection" filed Aug. 5, 2003, now U.S. Pat. No. 7,072,651. It is also a continuation-in-part of U.S. patent application Ser. No. 11/374,437 titled "Anti-Traffic Redirection System" filed Mar. 14, 2006. It is also a continuation-in-part of U.S. patent application Ser. No. 11/374,427 titled "Method, system and computer program product for countering anti-traffic redirection" filed Mar. 14, 2006. It is also a continuation-in-part of U.S. patent application Ser. No. 11/402,128 titled "Inbound traffic redirection system" filed Apr. 12, 2006. It is also a continuation-in-part of U.S. patent application Ser. No. 11/375,577 titled "Method and apparatus by which a home network can detect and counteract visited network inbound network traffic redirection" filed Mar. 15, 2006. It is also a continuation-in-part of U.S. patent application Ser. No. 11/366,021 titled "Inbound roamer call control system" filed Mar. 2, 2006, claiming priority to U.S. Provisional Application No. 60/658,258, filed Mar. 2, 2005. It is also a continuation in part of U.S. patent application Ser. No. 11/366,017 titled "Dynamic Generation of Camel Subscription Information For Outbound Roamers" filed Mar. 2, 2006, claiming priority to a U.S. Provisional Application No. 60/657,798, filed Mar. 2, 2005. It is also a continuation-in-part of U.S. patent application Ser. No. 12/153,453 titled "Method and System for Exchanging NRTRD Files Between a Visited Network and a Home Network in Real Time" filed May 19, 2008, claiming priority to U.S. Provisional Application No. 60/924,525 titled "Real Time Roaming Data Exchange Service" filed May 19, 2007. Each of these related applications is incorporated herein by reference in its entirety.

FIELD OF THE INVENTION

The present invention generally relates to mobile communication. More specifically, the invention relates to roaming intelligence on real roaming traffic.

BACKGROUND

Roaming traffic contributes a significant percentage of a network operator's revenue and even a better percentage of the network operator's margin. The network operator usually has multiple options of Roaming Partner Networks (RPNs) available for its inbound and outbound roaming traffic. Different outbound options may result in different revenue and margin to a home network operator, in addition to different user experience and service quality to the home network operator's outbound roamers. Likewise, different inbound options may affect revenue and margin to a visited network operator. Therefore, a network operator needs to have business insight on both its inbound and outbound roaming traffic so as to maximize its revenue and margin.

Offline Data Clearing House (DCH) approach provides business intelligence tool that enables network operators to manage their financial data related to Transferred Account Procedure (TAP) transactions between them and other network operators (e.g., RPNs). However, DCH is a non real-time approach, since it is based on TAP file exchange that may flow up to more than thirty days after call completion. Although, Near Real Time Roaming Data Exchange (NR-TRDE) approach improves the delivery of inbound and outbound roaming usage traffic to less than four hours, however, it is still not completely real time. Moreover, this approach is unable to capture Signaling System #7 (SS7) intelligence of roaming environment.

Some of the existing online passive probe approaches provide real time information on roaming traffic. Many SS7 probe vendors have probes deployed at roaming links of a home network to capture all SS7 signaling messages. However, such passive probe approaches focus only on the operational aspects and protocol level details of the roaming traffic, rather than business intelligence of the roaming environment.

Furthermore, a real-time active remote probe approach uses remote mobile stations on test roamers to detect fraud and service level issues. In this approach, many vendors have test Subscriber Identity Modules (SIMs) dynamically distributed to the mobile stations. The remote probe approach has its intrinsic limitations in terms of footprint, available user profile and handset equipment, and fails to cover mobility-related issues. Furthermore, this approach is unable to provide information on the real roaming traffic.

Focus of one or more of the above-mentioned approaches is directed towards technical performance indicators, whether they are networks, services or usages. None of the existing approaches provides a complete picture of the network operator's roaming environment, in particular, inbound roaming since inbound roamers are controlled by the RPNs. Most network operators have recently initiated a move from this network-provider model to service provider model. It implies the monitoring needs are shifting from a pure technical and operational concern to an end-to-end service delivery control.

At the same time, the business environment has changed greatly. Technically, GSMA rules and other innovative solutions (like SoR and Camel-based solutions) have made technical environment more complex and introduced protocol interaction for delivering high-quality services. This impacts not only the network protocol handling but also the billing information transfer process. Business-wise, these roaming regulations enforced in the markets force the network operators to differentiate at quality and service level rather than just on price. This reinforces the requirement for quality delivery monitoring and also the need of fraud control and prevention of revenue leakage.

In the process to secure roaming revenues and, therefore, the availability and quality of the services offered to the inbound and outbound roamers, network operators tend to reduce their operational costs by outsourcing the network management tasks to third parties. It implies that these network operators are hardly able to understand the technical indicators to manage their roaming environment. Also, at the same time, the need to enhance service and business control becomes a key for such network operators.

In accordance with the foregoing, there is a need in the art of a system, a method, and a computer product for estimating business and technical indicators of a network operator so that the network operator can understand and control its complete roaming market distribution.

SUMMARY

The present invention is directed towards a method for facilitating roaming management of a host network. The method includes obtaining at a gateway associated with the host network, signaling messages of one or more roamers. The roamers are subscribers of either the host network or one or more non-host networks. The method further includes determining by the gateway, the host network's roaming arrangement with the non-host networks, based on analysis of one or more signaling messages from the obtained signaling messages.

Another aspect of the invention presents a system for facilitating roaming management of a host network. The system includes a gateway associated with the host network for obtaining signaling messages of one or more roamers. The roamers are subscribers of either the host network or one or more non-host networks. Further, the gateway determines the host network's roaming arrangement with the non-host networks, based on analysis of one or more signaling messages from the obtained signaling messages.

Yet another aspect of the present invention provides a computer program product including a computer usable program code for facilitating roaming management of a host network, by obtaining, using a gateway associated with the host network, signaling messages of one or more roamers. The roamers are subscribers of either the host network or one or more non-host networks. Further, the computer program product determines at the gateway, the host network's roaming arrangement with the non-host networks, based on analysis of one or more signaling messages from the obtained signaling messages.

BRIEF DESCRIPTION OF DRAWINGS

In the drawings, the same or similar reference numbers identify similar elements or acts.

DETAILED DESCRIPTION

Figure 1A:
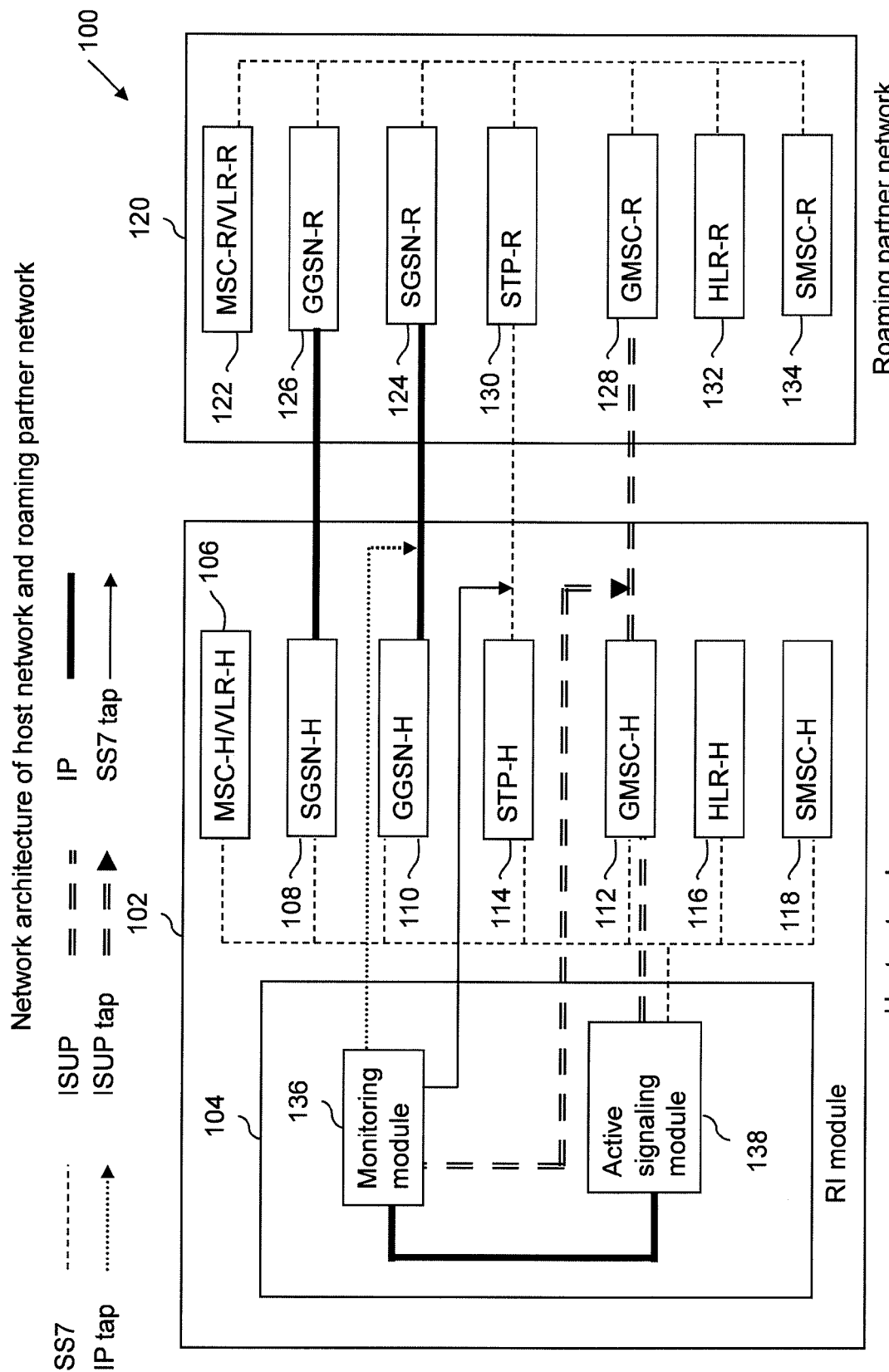
FIG. 1A illustrates a system for determining roaming arrangement for inbound and outbound roamers of a host network using a Roaming Intelligence (RI) module, in accordance with an embodiment of the present invention.

In the following description, for purposes of explanation, specific numbers, materials and configurations are set forth in order to provide a thorough understanding of the present invention. It will be apparent, however, to one having ordinary skill in the art that the present invention may be practiced without these specific details. In some instances, well-known features may be omitted or simplified, so as not to obscure the present invention. Furthermore, reference in the specification to "one embodiment" or "an embodiment" means that a particular feature, structure or characteristic, described in connection with the embodiment, is included in at least one embodiment of the present invention. The appearance of the phrase "in an embodiment", in various places in the specification, does not necessarily refer to the same embodiment.

The present invention provides a system, a method, and a computer program product that allows a host network operator to completely manage its roaming environment. This enables the host network operator to understand its inbound and outbound roaming traffic distribution. The roaming management includes understanding and controlling business and technical indicators, which may help boost the host network operator's roaming revenue. Various embodiments of the present invention describe roaming arrangement of the host network operator with one or more non-host network operators. In one embodiment of the present invention, the non-host network is a Roaming Partner Network (RPN) of the host network. The RPN corresponds to a network that has at least one roaming agreement such as, but not limited to, Global System for Mobile communication (GSM), General Packet Radio Services (GPRS), Customized Application for Mobile Enhanced Logic (CAMEL) and Third Generation of mobile (3G) agreement with the host network. In another embodiment of the present invention, the non-host network is a competitor network of the host network. In yet another embodiment of the present invention, the non-host network is any non-RPN of the host network that may not be a competitor of the host network. The non-host network may be either located in the host network's country, or in a country different from the host network's country.

Particularly, the host network operator is able to determine inbound and outbound roaming market trend, roaming competition distribution, revenue loss due to lack of some roaming agreements (e.g., CAMEL, GPRS, 3G etc.) between the host network and the non-host networks, and RPNs' traffic distribution. Moreover, the present invention allows the host network operator to identify those non-host network operators that apply Steering of Roaming (SoR) in favor of or against the host network, and determine the impact of such SoR techniques on the host network operator's roaming revenue. The impact can be positive, i.e., when the non-host network operator moves the roaming traffic towards the host network operator, or can be negative, i.e., when the non-host network operator moves the roaming traffic away from the host network operator. For outbound roaming, the host network operator is able to determine its outbound roaming traffic that is steered towards the non-host networks. Additionally, the host network operator is able to identify reasons for revenue loss, e.g., due to leakage in its network. Various embodiments of the present invention provide exact location information (e.g., cell ID) where roamers are lost, captured or recaptured.

The host network operator manages its roaming arrangement with non-host networks by deploying a gateway, either at a centralized location or in the host network. In an embodiment of the present invention, in case the gateway is deployed at the centralized location (this scenario is hereinafter interchangeably referred to as centralized approach), one or more client network operators share the gateway with the host network operator. In this case, like host network operator, the client network operators determine their respective roaming arrangement with their non-host networks. The centralized approach enables the client network operators to have a common Key Performance Indicators (KPI) console to evaluate performance and improvement opportunities of each client network.

Figure 1B:
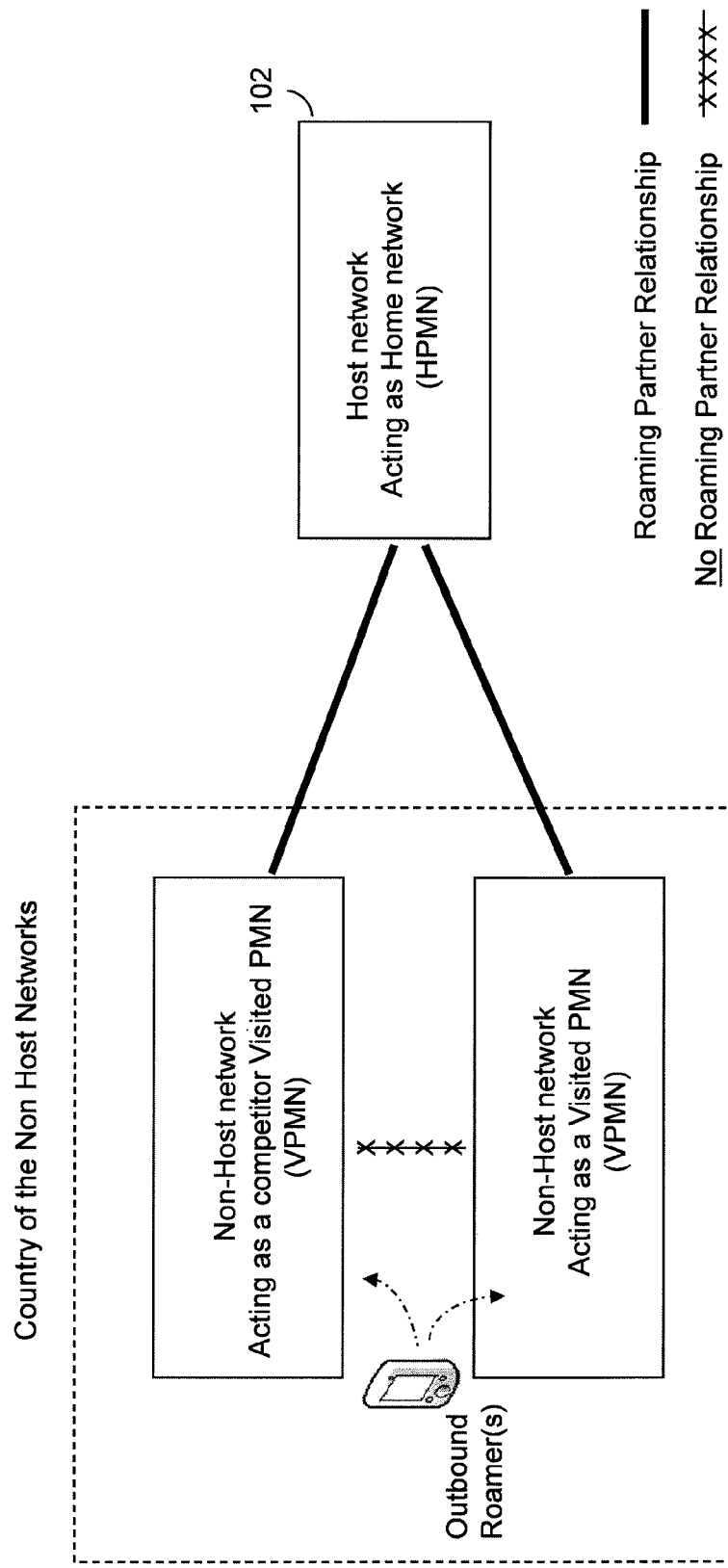
FIGS. 1B and 1C illustrate a high level overview of a host, non-host, and roaming partner relationship in accordance with an embodiment of the present invention.
Figure 1C:
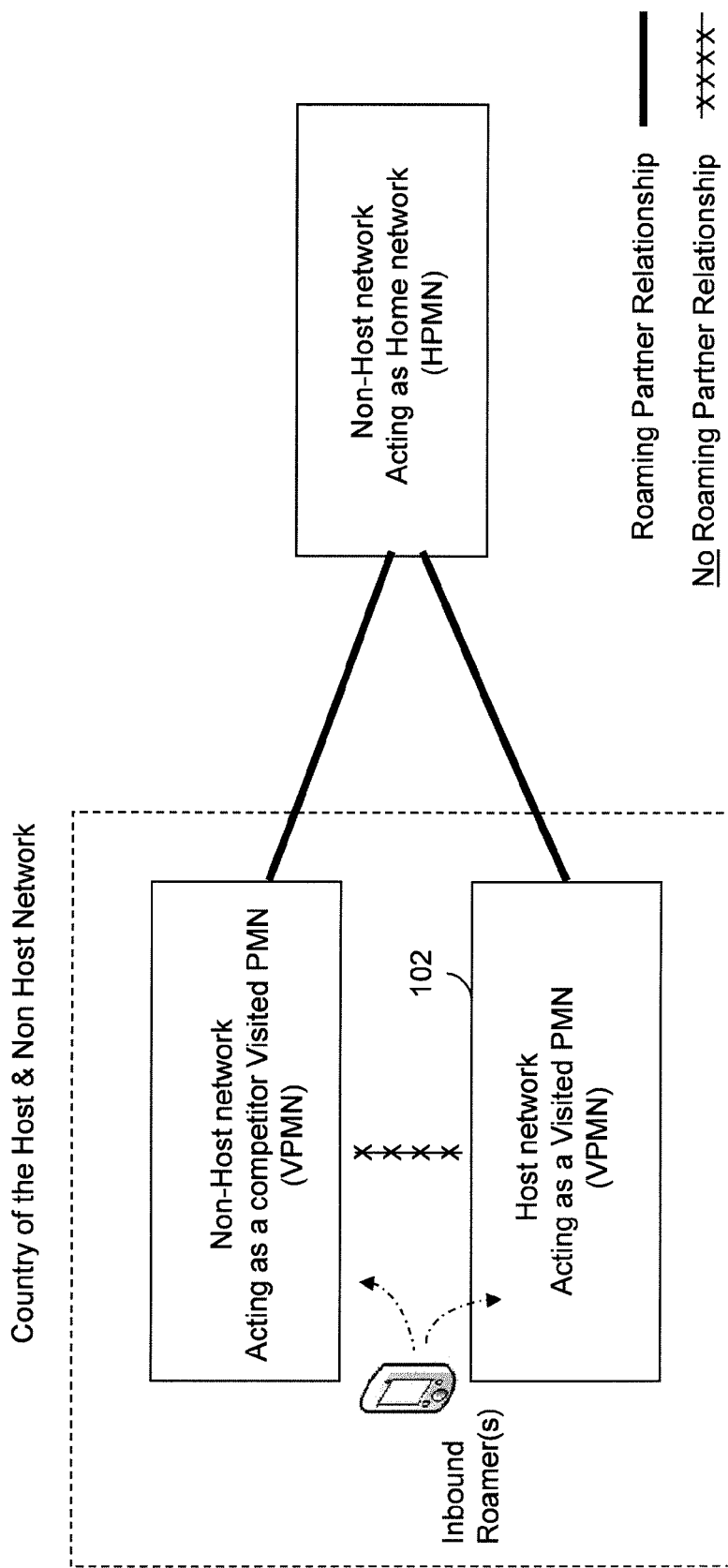

FIG. 1A illustrates a system 100 that determines roaming arrangement for inbound and outbound roamers (together hereinafter interchangeably referred to as roamers) of a host network 102, in accordance with an embodiment of the present invention. System 100 includes a Roaming Intelligence (RI) module 104 (i.e., the gateway) in host network 102 that manages roaming arrangement of host network 102 operator. Host network 102 operator uses RI module 104 to estimate technical and business indicators (i.e., KPI) so as to depict its roaming arrangement with other networks. In an embodiment of the present invention, RI module 104 estimates KPI for its outbound roamers that may roam in any of the non-host networks, and its inbound roamers that may be coming from any of these non-host networks. Thus, as shown in FIG. 1B, host network 102 operator acts as a Home PMN (HPMN) of the outbound roamers, whereas non-host networks in which these outbound roamers may roam act as their Visited PMNs (VPMNs). Similarly, as shown in FIG. 1C, host network 102 acts as a VPMN for the inbound roamers, whereas non-host networks to which these inbound roamers belong, act as their HPMNs.

Host network 102 further includes a Mobile Switching Center (MSC)/Visitor Location Register (VLR) 106, a Serving GPRS Support Node (SGSN) 108, a Gateway GPRS Support Node (GGSN) 110, a Gateway MSC (GMSC) 112, a roaming Signal Transfer Point (STP) 114, a Home Location Register (HLR) 116 and a Short Message Service Center (SMSC) 118. Since network elements MSC/VLR 106, SGSN 108, GGSN 110, GMSC 112, STP 114, HLR 116 and SMSC 118 reside in host network 102, they are hereinafter referred to as MSC-H/VLR-H 106, SGSN-H 108, GGSN-H 110, GMSC-H 112, STP-H 114, HLR-H 116 and SMSC-H 118, respectively. These network elements communicate with each other over a Signaling System 7 (SS7) link (represented by dashed lines in FIG. 1A), except that SGSN-H 108 communicates with GGSN-H 110 via an Internet Protocol (IP) link (represented by solid lines in FIG. 1A).

System 100 further includes a RPN 120 (i.e., the non-host network) with which host network 102 has at least one roaming agreement. It will be apparent to a person skilled in the art that system 100 may include various other RPNs. However, for the sake of convenience, this embodiment considers only one RPN (i.e., RPN 120). RPN 120 includes a MSC/VLR 122, a SGSN 124, a GGSN 126, a GMSC 128, an STP 130, an HLR 132 and an SMSC 134. Since network elements MSC/VLR 122, SGSN 124, GGSN 126, GMSC 128, STP 130, HLR 132 and SMSC 134 reside in RPN 120, they are hereinafter referred to as MSC-R/VLR-R 122, SGSN-R 124, GGSN-R 126, GMSC-R 128, STP-R 130, HLR-R 132 and SMSC-R 134, respectively. All these network elements of RPN 120 communicate with each other over the SS7 link, except that SGSN-R 124 communicates with GGSN-R 126 via the IP link. Further, as shown in FIG. 1A, the network elements of RPN 120 also communicate with the network elements of host network 102. For example, GMSC-R 128 communicates with GMSC-H 112 over an ISDN User Part (ISUP) link, whereas SGSN-R 124 and GGSN-R 126 communicate with GGSN-H 110 and SGSN-H 108, respectively via the IP link. Other network elements of RPN 120 (e.g., MSC-R/VLR-R 122) communicate with various other network elements of host network 102 (e.g., HLR-H 116) via the SS7 link. It will also be apparent to a person skilled in the art that host network 102 and RPN 120 may also include various other network components (not shown in FIG. 1A), depending on the architecture under consideration.

In an embodiment of the present invention, in order to determine host network 102's roaming arrangement with RPN 120, RI module 104 interfaces with the network elements in host network 102 and RPN 120, or monitors signaling messages exchanged at roaming signaling links of host network 102, or does both. These tasks are handled by a monitoring module 136 and an active signaling module 138 of RI module 104. In various embodiments of the present invention, monitoring module 136 taps SS7 and IP roaming links between network elements of host network 102 and RPN 120, in order to monitor roaming signaling traffic and packet data traffic at host network 102 without the use of any remote probes. The roaming signaling traffic includes both Signaling Connection Control Part (SCCP) and ISUP traffic. The SCCP traffic includes Mobile Application Part (MAP) traffic, CAMEL Application Part (CAP) traffic and Transaction Capabilities Application Part (TCAP) traffic. For packet data traffic, monitoring module 136 monitors the IP link in a Gp interface between SGSN-H 108 and GGSN-R 126, and between GGSN-H 110 and SGSN-R 124, in accordance with an embodiment of the present invention. Monitoring module 136 further taps the SS7 link between STP-H 114 and STP-R 130, and the ISUP link between GMSC-H 112 and GMSC-R 128, in accordance with another embodiment of the present invention. In one embodiment of the present invention, monitoring module 136 passively taps signaling path between the network elements of host network 102 and RPN 120.

Furthermore, in an embodiment of the present invention, active signaling module 138 facilitates exchange of roaming signaling traffic and packet data traffic between host network 102 and RPN 120 for host network 102's outbound and inbound roamers. Additionally, in another embodiment of the present invention, active signaling module 138 communicates with the network elements of host network 102 internally (e.g., communicates with GMSC-H 112 via the ISUP link and communicates with MSC-H/VLR-H 106 via the SS7 link).

Figure 2:
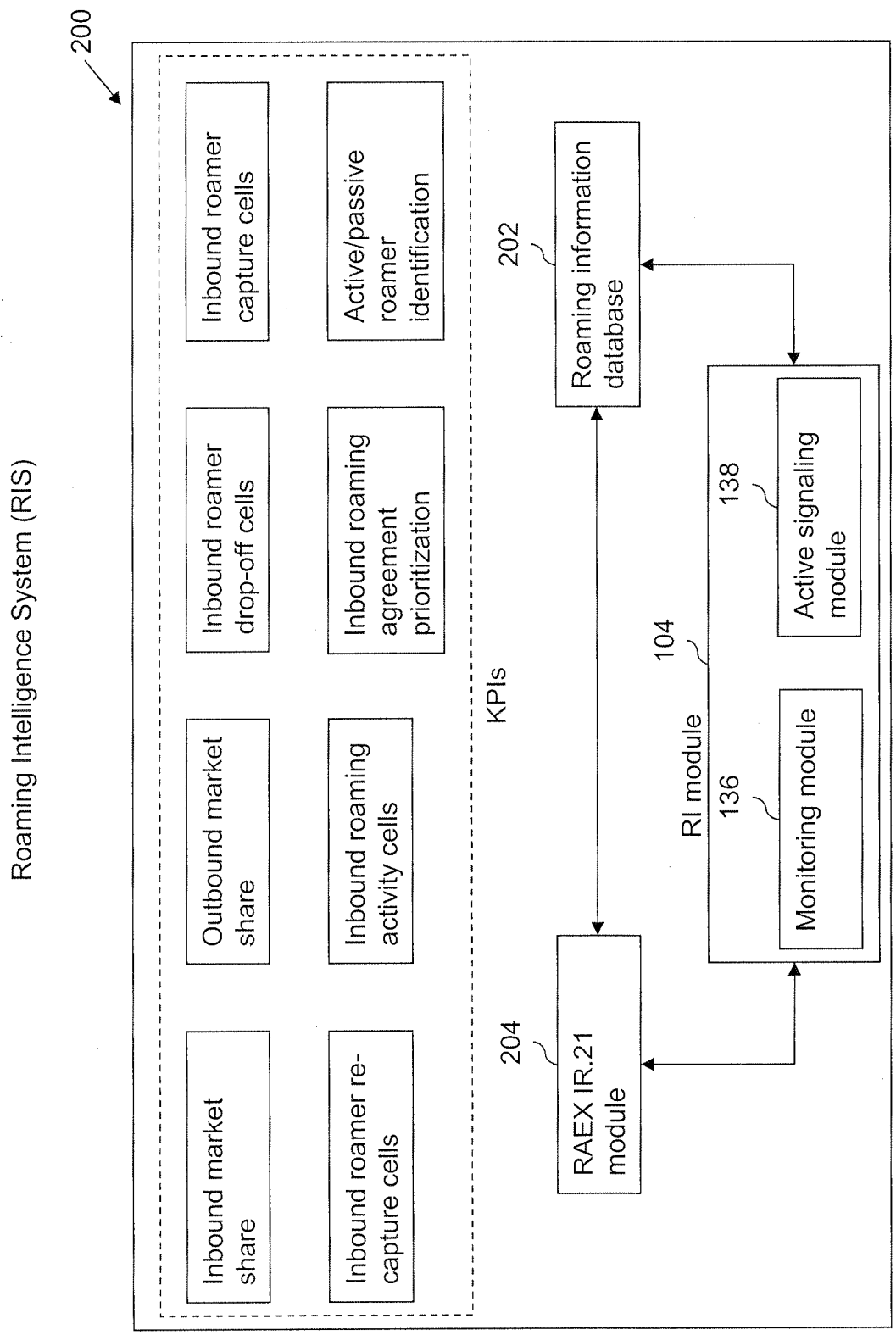
FIG. 2 illustrates a detailed architecture of a RI System (RIS) using the RI module, in accordance with an embodiment of the present invention.

In order to determine complete roaming arrangement for host network 102, RI module 104 may use various other modules (apart from monitoring module 136 and active signaling module 138), depending upon the type of roaming arrangement to be presented to host network 102 operator. FIG. 2 illustrates a detailed architecture of a RI System (RIS) 200 that uses RI module 104, in accordance with an embodiment of the present invention. RIS 200 allows host network 102 operator to determine its complete roaming arrangement with one or more non-host networks. RIS 200 includes a roaming information database 202 (for the sake of convenience, it is hereinafter interchangeably referred to as database 202), in addition to monitoring module 136 and active signaling module 138. In a first embodiment of the present invention, database 202 contains all information necessary to identify the inbound and outbound roamers, and their locations information (e.g., host network 102 operator's Mobile Country Code (MCC) and Mobile Network Code (MNC) definitions, Network Global Title (GT) ranges etc.) that can be provisioned manually, by flat file, or via Roaming Agreement Electronic exchange (RAEX). In a second embodiment of the present invention, database 202 includes all IR.21 information necessary to facilitate report creation and link network information. In this case, database 200 includes International Mobile Subscriber Identity (IMSI) range, GTs, Mobile Station International Subscriber Directory Numbers (MSISDNs), Mobile Station Roaming Number (MSRN) ranges, IP ranges etc. including the HPMN (i.e., RPN 120 in case of inbound roaming and host network 102 in case of outbound roaming) information. In a third embodiment of the present invention, database 202 includes national and international interconnect information (e.g., Point Code (PC) and Circuit Identification Code (CIC) ranges).

Furthermore, host network 102 operator is able to achieve information gathering and maintenance using an RAEX IR.21 module 204 that processes information received from distant RPNs and/or by accessing common technical information shared in RIS 200. In a fourth embodiment of the present invention, database 202 also includes protocol data that enables RIS 200 to process, combine and correlate different signaling information. Signaling information corresponds to one or more fields extracted from signaling messages obtained at RIS 200. For example, RIS 200 can extract the IMSI from a MAP Location Update (LUP) message (i.e., a registration message), and the MSISDN from a subsequent MAP Insert Subscriber Data (ISD) message. RIS 200 is able to combine information from different protocol sources and active signaling interactions, thus creating value-added information. Moreover, the protocol data enables RIS 200 to link different signaling messages of a same protocol or different protocols such as, but not limited to, MAP, CAP, Intelligent Network Application Part (INAP) and ISUP. In an embodiment of the present invention, RIS 200 performs protocol correlation based on various criteria. The criteria include time difference between events of the roamers, network information, one or more SCCP addresses (including Sub System Number (SSN)) like Calling Party Addresses (CgPAs) and Called Party Addresses (CdPAs), MAP information, CAP information, ISUP information, profile information of the roamers, IMSIs of the roamers, Temporary IMSIs (TIMSIs) of the roamers, MSISDNs of the roamers, and International Mobile Equipment Identities (IMEIs) of the roamers. The definition of new combination or correlation in terms of relationships between different protocols and their outcome is available even after RIS 200 restarts, in addition to when it is up and running. Sharing information, i.e., offering signaling information from an HPMN to a VPMN may assist in delivering new information not available earlier. In addition, bringing geographical information into RIS 200 may provide relevant geo-marketing information. For example, defining X-Y coordinates of a Cell-ID (CI) identified by a Location Area Code (LAC)-CI can provide precise geographical information about the monitored event.

Further, in various embodiments of the present invention, RIS 200 allows host network 102 operator to estimate one or more KPIs such as inbound market share, outbound market share, inbound roamer drop-off cells, inbound roamer capture cells, inbound roamer re-capture cells, inbound roaming activity cells, inbound roaming agreements, and active/inactive roamer identification. These KPIs help host network 102 operator to determine complete market distribution of its inbound and outbound roamers (i.e., host network 102's roaming arrangement). Estimating these KPIs involves RI module 104 and in some cases also involves database 202. Each of these KPIs is described below in various sections of the present invention.

Figure 3:
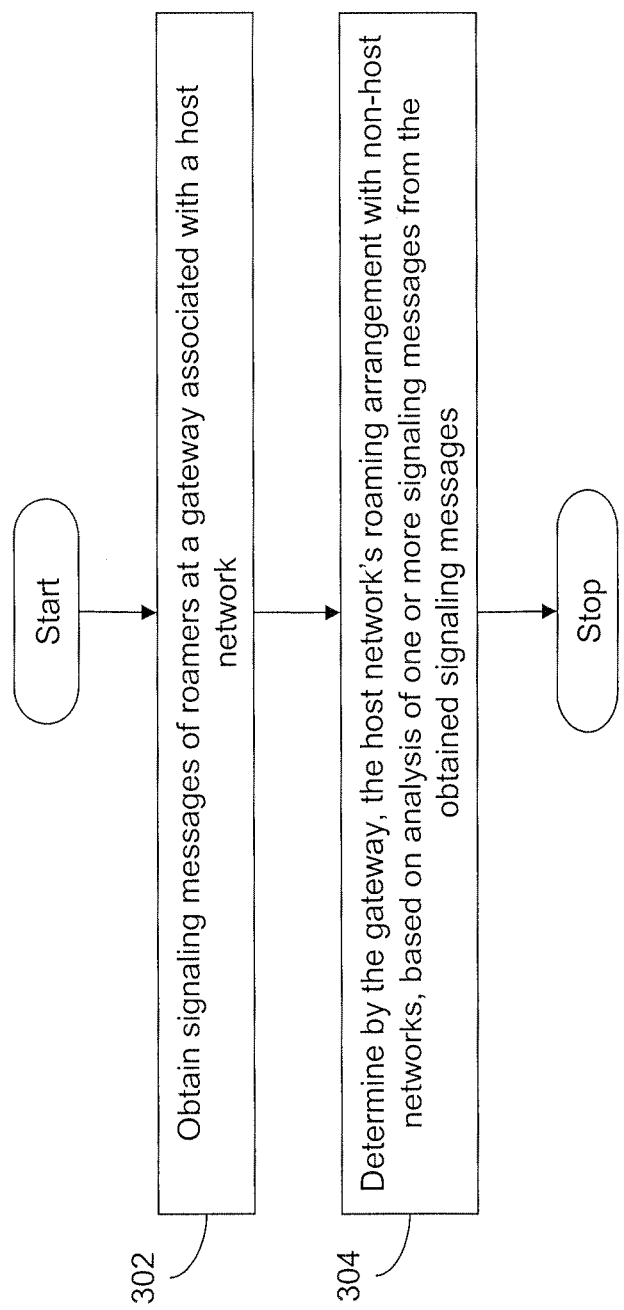
FIG. 3 represents a flowchart for managing roaming environment of the host network, in accordance with an embodiment of the present invention.

As mentioned above, in order to manage roaming environment of host network 102, RI module 104 needs to determine complete roaming arrangement of host network 102's inbound and outbound roamers. FIG. 3 represents a flowchart for managing roaming environment of host network 102, in accordance with an embodiment of the present invention. At step 302, RI module 104 obtains signaling messages of the roamers. The signaling messages include messages such as, but not limited to, one or more LUP messages, one or more Cancel Location messages (i.e., registration cancellation messages), one or more location information messages such as Provide Subscriber Information (PSI) and PSI-ACK messages, one or more CAP messages such as CAP Initial DP (IDP) messages, one or more call event messages such as Provide Roaming Number (PRN) requests, one or more Mobile Terminated (MT) Short Message Service (SMS) events such as MT-FwdSMS. In one embodiment of the present invention, RI module 104 obtains the signaling messages using active signaling module 138 (i.e., by active interfacing). In another embodiment of the present invention, RI module 104 obtains the signaling messages using monitoring module 136 (i.e., by passive monitoring).

Thereafter, at step 304, RI module 104 determines host network 102 operator's roaming arrangement with the non-host networks, based on analysis of one or more signaling messages from the obtained signaling messages. RI module 104 determines host network 102 operator's roaming arrangement with RPN 120 by selecting messages from the obtained signaling messages that are used by RI module 104 to estimate a specific KPI. In an embodiment of the present invention, RI module 104 estimates the KPI upon detecting a receipt of the signaling message at RI module 104. RI module 104 can also estimate the KPI using signaling information in the selected signaling messages. In an embodiment of the present invention, RI module 104 extracts signaling information from the signaling messages so as to estimate the KPI. As mentioned above, the KPI includes business and technical indicators.

The business indicators of RIS 200 are as follows:
Identify business threats, and opportunities offered by a more complex technical environment (e.g., SoR by RPN 120 to steer its outbound roaming traffic towards host network 102) to host network 102 operator. In an embodiment of the present invention, RI module 104 allows host network 102 operator to understand distribution of its outbound roaming traffic between different RPNs. In another embodiment of the present invention, RI module 104 allows host network 102 operator to understand distribution of RPNs' outbound roaming traffic between host network 102 and its domestic competitors.

Identify cells of host network 102 where inbound roamers are captured, dropped-off from the network, and possibly reattached to host network 102, in order to enhance radio deployment strategy.

The interaction between different protocols and the introduction of new technologies may offer new business challenges. RIS 200 enables host network 102 operator to identify new opportunities (e.g., appropriate selection of network operators for opening CAMEL, 3G or GPRS support) or threatening actions from domestic competitor networks (i.e., in host network 102's country) or RPNs.

Evaluate roaming service usage of a particular roamer of host network 102 based on objective and estimated information.

Estimate the inbound and outbound roaming traffic distribution.

Identify RPNs that perform SoR techniques on host network 102's inbound roaming traffic and impact of such SoR techniques on host network 102's inbound roaming revenue.

The technical indicators of RIS 200 are as follows:
Obtain all the LUP and Cancel Location messages of roamers to calculate the stay period of host network 102's roamers in its own network (i.e., inbound roaming market share) and RPNs (i.e., outbound roaming market share), Estimate stay periods of host network 102's departing roamers in competitor networks by periodically issuing location queries on the departing roamers, Obtain all LUP messages of host network 102's outbound roamers at non-RPNs for outbound traffic, and host network 102's inbound roamers from non-RPNs for inbound traffic in order to deduce prioritization of host network 102's roaming agreements with such non-RPNs, Observe LUP response messages on host network 102's inbound roamers, and calculate success and failure ratio including historical data of these inbound roamers so as to determine RPNs (i.e., home network operators of these inbound roamers) that are doing SoR on such inbound roamers. In an embodiment of the present invention, RI module 104 determines the roaming traffic from the RPNs that is steered towards host network 102, and the roaming traffic from the RPNs that is steered away from host network 102.

Inbound Roaming Market Share

The objective of this KPI is to determine host network 102 operator's market share against other network operators in host network 102's country. This helps host network 102 operator to estimate the number of inbound roamers connected with its network. This allows host network 102 operator to negotiate wholesale deals with its RPNs (e.g., RPN 120), since host network 102 operator has a better insight on its RPNs' capability to send roamers on its network. This KPI also provides information on market shares of all other network operators in host network 102's country to host network 102 operator. The market share includes voice, SMS, GPRS, CAMEL, 3G etc. based on the estimated duration that these roamers spent at each network operator of host network 102's country. The market share can be further classified into different types of roamers, e.g., GPRS, 3G and CAMEL roamers. Additionally, in an embodiment of the present invention, RI module 104 captures device information of the roamers to estimate usages of Blackberry roamers, CAMEL roamers, 3G roamers etc. in host network 102.

Moreover, this KPI also allows host network 102 operator to measure the impact on its inbound roaming market share due to any recently introduced inbound roaming service in either its network or a competitor network of host network 102. This indicator allows host network 102 operator to get better discounts in Inter-Operator Tariff (IOT), and negotiate better deals on SoR with RPNs to get more inbound roaming traffic from these RPNs. Additionally, this KPI allows host network 102 operator to understand how other network operators fares in different zones of the same Country, which eventually facilitate host network 102 operator to target its inbound roaming market or create better network for inbound roamers. For example, host network 102 operator can determine that Vodafone, Mumbai has a better GPRS inbound roamer usage than Airtel, Mumbai; while in Delhi it is vice versa.

In an existing solution, network operators monitor exchange of SMS between local subscribers and roamers in a country. Although this approach provides relevant results; however, number of available samples is directly linked to traffic pattern of the subscribers. Thus, due to lack of samples, the approach fails to accurately measure the network operator's market share.

On the other hand, in accordance with various embodiments of the present invention, RI module 104 enables host network 102 operator to accurately estimate the inbound roaming market share using the following four steps:

1. Sampling size estimation: RIS 200 first calculates number of samples necessary to determine the inbound roaming market share. The calculation is based on host network 102's operator's accuracy requirement. Referring to a published statistical theory, RIS 200 enables the selection of a 'confidence interval' level of the estimation. By setting the level of 'confidence interval', RIS 200 can evaluate a tabulated coefficient, known as z-alpha/2 (or z-score). Typical values are:

| Level of confidence | z-alpha/2 |
|---|---|
| 90% | 1.645 |
| 95% | 1.96 (recommended) |
| 98% | 2.33 |
| 99% | 2.575 |

In an embodiment of the present invention, RIS 200 defines a second parameter, prior to calculating the sampling size. The second parameter is the accuracy of the estimate, i.e., a tolerance Width (W) around the estimated market share (e.g., estimated market share +/−3%). The actual sample sizing may depend on the level of insight about the market share to be estimated.

In a first embodiment of the present invention, in case RIS 200 has no prior knowledge of the estimated market share, the calculation is as follows:

$$n = \left(\frac{z_{\alpha/2}}{2 \cdot W}\right)^2 \quad (1)$$

where n represents the number of samples. In an exemplary case, with Z-alpha/2=1.96 and W=3%, 1068 samples are needed to determine host network 102's inbound roaming market share.

Alternatively, in a second embodiment of the present invention, in case RIS 200 has a prior knowledge of the estimated market share then RIS 200 can optimize the number of samples. With p as the expected market share, the number of samples (n) is determined by:

$$n = \left(\frac{z_{\alpha/2} \cdot \sqrt{p \cdot (1-p)}}{W}\right)^2 \quad (2)$$

In an exemplary case, with Z-alpha/2=1.96, W=3% and expected market share of 80%, the number of samples required is 683.

2. The selection of samples: For each network whose market share is to be evaluated, RIS 200 identifies a set of inbound roamers from the non-host networks that have previously roamed in host network 102. In an embodiment of the present invention, RI module 104 interrogates database 200 to access inbound roamers' information such as IMSIs, MSISDNs, HLR numbers. RIS 200 may select the inbound roamers based on various criteria. One criterion is based on an MCC and an MNC identifier included in the IMSI of the inbound roamer, in accordance with an embodiment of the present invention. Since the inbound roamer is coming from RPN 120, the IMSI of the inbound roamer is hereinafter referred to as IMSI-R. Moreover, an MSISDN corresponding to the inbound roamer's IMSI-R is hereinafter referred to as MSISDN-R. Another criterion is based on host network 102 operator selecting inbound roamers based on their types, in accordance with another embodiment of the present invention. For example, RIS 200 selects the inbound roamers that are CAMEL-enabled, and also have access to GSM/GPRS or both. In this case, RIS 200 ascertains the distribution of types of the selected roamers. Depending on the selection criteria, host network 102 operator can be aware of the inbound roaming market distribution of GSM, GPRS and CAMEL-enabled inbound roamers, and complete inbound roaming market distribution. Once the roamers are selected, RIS 200 checks that the number of the selected roamers is equal to the calculated number of samples. From this selected list of roamers, RIS 200 randomly selects a sample and applies one of the methods on the selected sample as described below under location discovery.

Figure 4A:
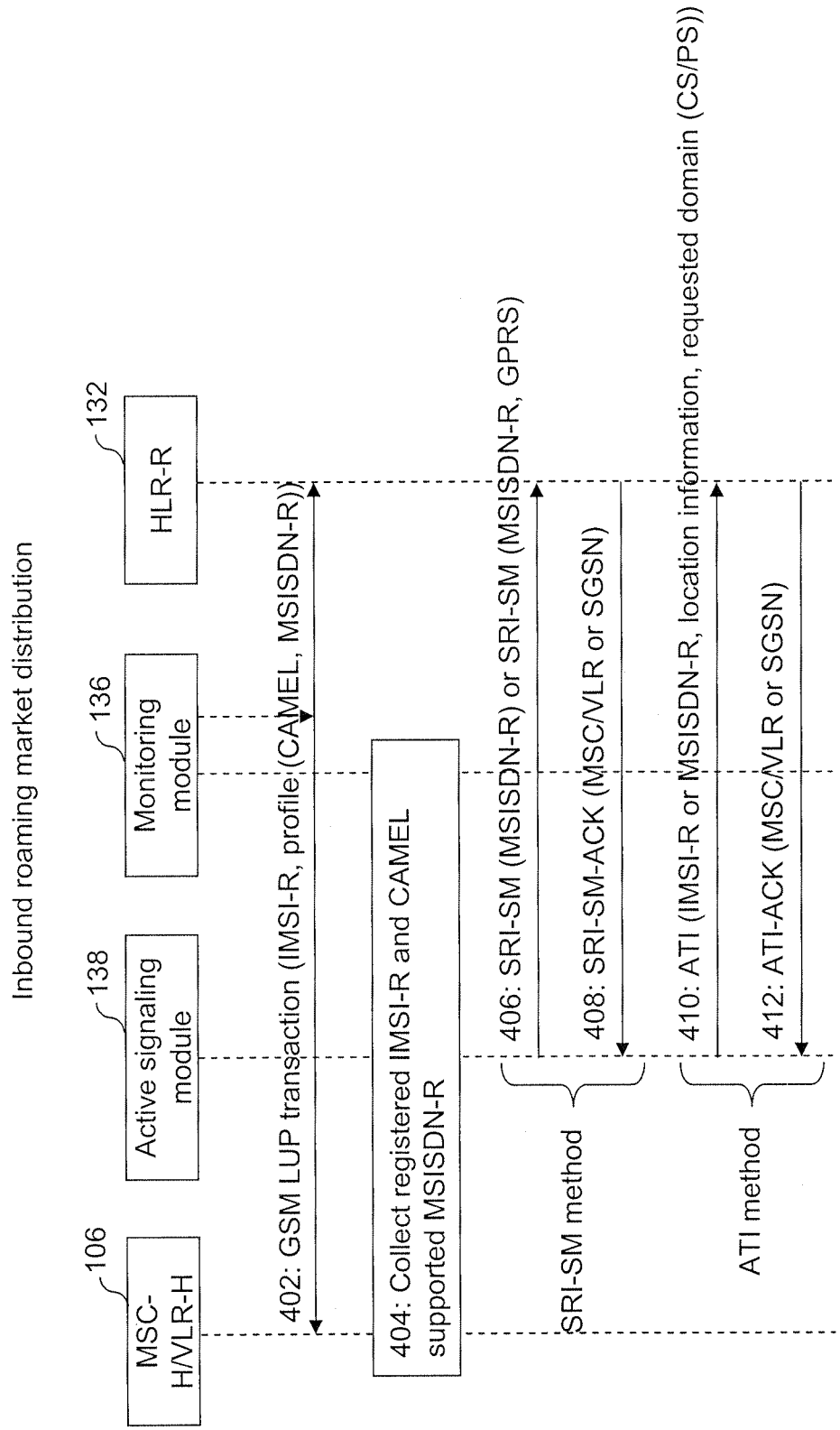
FIGS. 4A and 4B represent a flow diagram for estimating inbound roaming market share of the host network, in accordance with an embodiment of the present invention.
Figure 4B:
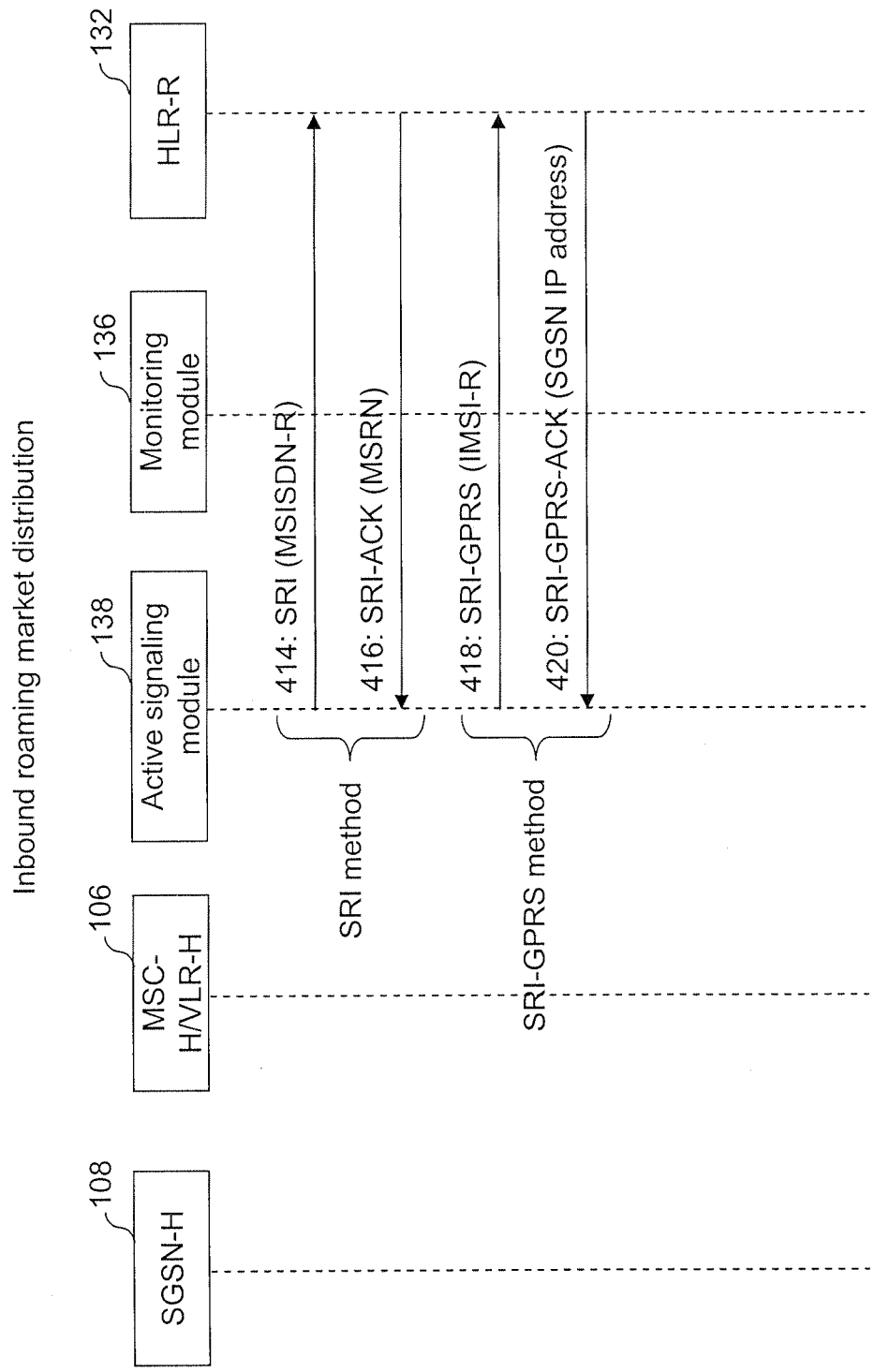

3. Location discovery: Host network 102 operator uses RI module 104 to obtain the location of the inbound roamer. FIGS. 4A and 4B represent a flow diagram for estimating inbound roaming market share of host network 102, in accordance with an embodiment of the present invention. This embodiment considers the inbound roamer coming from RPN 120 and roaming in host network 102's country. RI module 104 selects one of the four polling methods described below (after validating them) that is applicable for the network whose market share is to be estimated. In an embodiment of the present invention, RI module 104 validates one of these polling methods for the inbound roamers of host network 102. In other words, RI module 104 determines the polling method that is supported by RPN 120 for determining location of the inbound roamer. For example, an SRI-SM method described later may not be supported by RPN 120, e.g., since RPN 120 applies home routing mechanism, which may result in providing incorrect location information to RI module 104. The inbound roamer can be attached to host network 102 using a test Subscriber Identity Module (SIM) card. Alternatively, the inbound roamer can be a real user known by RI module 104 to be registered with host network 102 at the time of validating the polling methods. In an embodiment of the present invention, RI module 104 performs one of these polling methods at a configurable time interval. RI module 104 continuously monitors LUP transactions of the inbound roamer, and it then applies the determined method to obtain the location of the inbound roamer when the inbound roamer is detected to move to another network in host network 102's country or zone. Hence at step 402, monitoring module 136 passively monitors LUP transactions of the inbound roamer between MSC-H/VLR-H 106 and HLR-R 132. Thereafter, at step 404, RI module 104 extracts IMSI-R from a LUP message, and MSISDN-R from an ISD message, both messages exchanged during the inbound roamer's LUP attempt at MSC-H/VLR-H 106. In this case, since CAMEL profile is also exchanged during the inbound roamer's LUP transaction, the inbound roamer is CAMEL-enabled by HLR-R 132. In an embodiment of the present invention, RI module 104 stores the extracted information in database 202.

When monitoring module 136 detects that the inbound roamer has moved to another network in host network 102's country or zone, RI module 104 stores the new location of the roamer obtained by monitoring module 136. In a first embodiment of the present invention, RI module 104 selects a first polling method to obtain current (or new) location of the roamer from HLR-R 132. Since the first polling method uses a MAP Send Routing Info for Short Message (SRI-SM) operation, this polling method is hereinafter interchangeably referred to as SRI-SM method. Hence at step 406, active signaling module 138 issues a routing request for short message such as an SRI-SM request on the MSISDN-R to HLR-R 132 so as to obtain the new location of the roamer from HLR-R 132. At step 408, HLR-R 132 returns a MSC/VLR location as the new location of the roamer in an SRI-SM-ACK message to active signaling module 138. It will be apparent to a person skilled in the art that in case of GPRS; the LUP transaction, MSC-H/VLR-H 106, and the new MSC/VLR location are replaced with a GPRS-LUP transaction, SGSN-H 108 and a new SGSN location of the roamer, respectively. Also, in case of GPRS, active signaling module 138 sends the SRI-SM request with the option "GPRS support indicator" available to HLR-R 132 (i.e., at step 406). Furthermore, in order to determine whether the applied method is valid, RI module 104 correlates the roamer's location obtained from the SRI-SM-ACK message with the roamer-'s known real location, in accordance with an embodiment of the present invention. In case the results match, RI module 104 marks the applied method as valid. Otherwise, in case RPN 120 (i.e., the home network of the inbound roamer) applies a home routing strategy for its subscribers, RI module 104 marks the applied method as invalid.

Alternatively, in a second embodiment of the present invention, RI module 104 selects a second polling method to obtain current location of the roamer from HLR-R 132. Since the second polling method uses Any Time Interrogation (ATI) operation, this polling method is hereinafter interchangeably referred to as ATI method. At step 410, active signaling module 138 issues an interrogation message such as an ATI message on the MSISDN-R or the IMSI-R to HLR-R 132 with the roamer's location information and requested domain (i.e., Circuit Switched (CS) or Packet Switched (PS)) Thereafter at step 412, HLR-R 132 returns a MSC/VLR location (CS) as the new location of the roamer in an ATI-ACK message to active signaling module 138. It will be apparent to a person skilled in the art that in case of GPRS; an SGSN location (PS) of the roamer is received at active signaling module 138, rather than the MSC/VLR location.

In a third alternative polling method, RI module 104 imitates the Optimal Routing (OR) functionality by interrogating HLR-R 132 with a routing request message such as a MAP SRI request, in accordance with a third embodiment of the present invention. Since the third polling method uses SRI operation, this polling method is hereinafter interchangeably referred to as SRI method. In this case, active signaling module 138 issues the MAP SRI request on the MSISDN-R to HLR-R 132, at step 414. Thereafter at step 416, HLR-R 132 returns an MSRN corresponding to the MSISDN-R in an SRI-ACK message to active signaling module 138. It will be apparent to a person skilled in the art that HLR-R 132, upon receiving the SRI request, issues a PRN request to the MSC/VLR location of the roamer for retrieving the MSRN in a PRN-ACK message. In an embodiment of the present invention, RI module 104 correlates the received MSRN with the roamer's visited network National Dialing Code (NDC) to identify the current location of the roamer. In case the correlation results in same location of the roamer, RI module 104 considers this third method as valid.

Alternatively, in a fourth embodiment of the present invention, RI module 104 selects a fourth polling method, which is based on a routing request message for GPRS such as a MAP SRI-GPRS request to determine the current location of the roamer. Since the second polling method uses SRI-GPRS operation, this polling method is hereinafter interchangeably referred to as SRI-GPRS method. In this case, active signaling module 138 issues the MAP SRI-GPRS request on the IMSI-R to HLR-R 132, at step 418. Thereafter at step 420, HLR-R 132 returns an SGSN IP address to active signaling module 138. In an embodiment of the present invention, RI module 104 matches this IP address with an SGSN IP address monitored by monitoring module 136.

4. Estimation of the market share: Once the current location of the roamer obtained, RI module 104 repeats the same polling method for other selected roamers. Once the number of roamers, whose locations are obtained at RI module 104, matches the number of required samples, RIS 200 derives the distribution of the selected roamers across different operators within host network 102's country with the required accuracy. In an embodiment of the present invention, when host network 102 operator wants to get insight on the market share distribution for a single RPN, the location distribution is a direct indicator. In this case, RI module 104 calculates the ratio of subscribers present in one network by the total number of polled subscribers.

Furthermore, RIS 200 can improve the market distribution knowledge by recording an average stay period of each of the selected roamer at each of the network present in host network 102's country (including host network 102). In other words, RIS 200 can calculate the average stay period in host network 102, and can estimate the stay period in other network operators in host network 102's Country by repeating one of the polling methods for a pre-defined time period (i.e., configurable by host network 102 operator). In an embodiment of the present invention, active signaling module 138 sends the location request to HLR-R 132 (i.e., polls) at a pre-defined frequency (e.g., every 15 minutes, 30 minutes or 1 hour, configurable by host network 102 operator) for each MSISDN that has left host network 102 but has not left host network 102's country or zone. Moreover, RI module 104 repeats this polling method on each selected roamer for a pre-defined time duration (e.g., 24 hours, again configurable by host network 102 operator) when the roamer is registered with the non-host network in host network 102's country. In an embodiment of the present invention, active signaling module 138 issues a blank SMS to the selected roamer when the obtained location of the selected roamer indicates that the roamer is present in his home network location. This may prevent the home network of the roamer from identifying the polling method as an SMS faking procedure.

In order to calculate the average stay period of the selected roamer in host network 102, RI module 104 determines the time difference between LUP and Cancel Location messages for the selected roamer at host network 102. In the other case, stay period of the roamer is also estimated by a time difference between:

Time of "End of Stay":
  i. LUP attempt of the roamer observed at host network 102 in case the roamer moves from the competitor network to host network 102, or
  ii. in case the polling method reports the roamer has moved from one host competitor network to another host competitor network.

Time of "Beginning of Stay"
  i. Cancel location on the roamer observed at host network 102 in case the roamer moves from host network 102 to the competitor network, or
  ii. In case the polling method reports the roamer has moved from one host competitor, network to another host competitor network.

Using the stay period methodology described above, host network 102 operator not only improves the insight on the market distribution for a single RPN (e.g. how RPN 120 distributes its outbound roamers among different networks in host network 102's country), but also creates aggregate information for all RPNs when host network 102 operator wants to assess the global influence of introduction of any new service on its inbound roaming market. For example, host network 102 operator can assess the affect of introducing a service like Short Code (SC) translation, call correction, Near Real Time Roaming Data Exchange (NRTRDE) etc. on its inbound roaming market share. Determining the market shares can be either per RPN operator based (e.g., Vodafone UK inbound roamers inbound market share) or per group based (e.g., Vodafone group, Bridge group etc.). Alternatively, determining the market share can also be per VPMN zone based (e.g., a province, a circle, a group of provinces or circles).

Furthermore, host network 102 operator can also determine home networks that apply SoR on their outbound roamers in host network 102's country. In an embodiment of the present invention, by determining the ratio of successful LUP over total LUP attempts per home network, RIS 200 is able to determine home network operators that SoR in favor of host network 102, and home network operators that SoR away from host network 102. Moreover, using the above-described inbound roaming market share KPI, host network 102 operator can calculate the inbound roaming market share per home network operator, individual group of operators (e.g., Vodafone), individual region (e.g., from Europe) etc.

Outbound Roaming Market Share

The objective of this KPI is to determine host network 102 operator's market share in a visited country. In other words, this KPI provides host network 102 operator an estimate of the roaming traffic generated by its outbound roamers in the visited country. This indicator allows host network 102 operator to get better discounts in IOT, and negotiate better deals on SoR with RPNs to send more outbound roaming traffic to these RPNs. Various other benefits of this KPI to host network 102 is similar to benefits of inbound roaming market share KPI to host network 102. By using outbound roaming market share KPI, host network 102 operator can understand how each network operator fares with respect to different zones of the same visited Country, so as to better target some selected network operators with promotional SMS techniques. For example, host network 102 operator can determine the usage of roamers in Beijing, Shanghai and rest of China.

Some of the existing approaches are based on TAP file analysis or on distribution of LUPs in a country for different network operators. Although, the former approach is directly related to financial figures, it is dependent upon the TAP file transfer process. Usually, network operators send TAP file up to thirty days after completion of a call event, which means that the network operators will have to wait for this long duration before they can compare the reported financial flows, and hence calculate the roaming market share distribution. Although, the latter approach, which is based on the LUPs, solves the issue of sending asynchronous TAP file; however, instead of measuring the usage of real roamer, it estimates the roaming market share based on mobility pattern. Estimating the roaming market share based on the mobility pattern is dependent upon the roamer's behavior, the roamer's handset and a visited network's topography.

On the other hand, in accordance with various embodiments of the present invention, RI module 104 enables host network 102 operator to accurately estimate the outbound roaming market share using any the following three methods:
  1. Stay period: RI module 104 monitors and calculates the stay period of each outbound roamer in different non-host networks of countries other than host network 102's country. In an embodiment of the present invention, RI module 104 determines the stay period of the outbound roamer per non-host network by a time difference between the LUP process and the subsequent cancel location process, identified by an IMSI and a corresponding MSC/VLR location of the outbound roamer. The aggregation of the information per network is configurable by host network 102 operator. For example, host network 102 operator may configure information aggregation on daily basis or weekly basis.

2. CAMEL Mobile Originated (MO) event: This case assumes that host network 102 operator has enabled all its outbound roamers (i.e., prepaid, postpaid, VPN etc.) with a CAP Originating CAMEL Subscription Information (O-CSI). In this method, RI module 104 determines the outbound roaming market share based on distribution of a CAP IDP between the non-host networks in a same Country. This metric also assumes that all such non-host networks are CAMEL-enabled with host network 102.

3. MT-call and MT-SMS events: In this method, RI module 104 determines the outbound roaming market share based on distribution of MT-call events or MT-SMS events between the non-host networks of the same country. MT-call events include MSRN requests (i.e., PRN requests and MSRN-based call duration), whereas MT-SMS events include SMS-FORWARD-MT messages.

In an embodiment of the present invention, since an outbound data market share is dependent on the volume exchanged between host network 102 and the non-host networks (e.g., RPN 120), RI module 104 uses monitoring module 136 to monitor IP flow so as to determine the outbound data market share.

Inbound Roamer Drop-off Cells

The objective of this KPI is to report to host network 102 operator the cells in host network 102 where the inbound roamer drop-offs occur, and determine the drop-offs to competitor networks in host network 102's country. Host network 102 operator can determine the drop-off cells per inbound roamer type, per inbound roamer usage, per home network operator of the inbound roamer, or per network operator group. In an embodiment of the present invention, RI module 104 determines the inbound roamer type using database 202. For roaming usage (i.e., GSM, GPRS, 3G, CAMEL etc.), RI module 104 provides MSC/VLR (or SGSN in case of GPRS) and LAC/CI information of the inbound roamer. Since, host network 102 operator needs to know correspondence between LAC/CI and a 3G cell or GPRS cell (or 3G cell or GSM cell), therefore, database 202 contains LAC/CI mapping with geographical information (X-Y coordinates) and technology. Determination of drop-off cells per home network operator or per network operator group is based on aggregation of roamer type. For example, RI module 104 can estimate a cell-id drop-off magnitude for a RPN (or a group of RPNs) by sum of number of cell-id drop-offs for the inbound roamer belonging to that RPN (or the group of RPNs). RIS 200 may report inbound roamer's home country border cell as a major drop-off cell, but distinguish that the inbound roamer loss is natural (i.e., roamer moved back to its home network) rather than to a competitor network of host network 102. This indicator facilitates host network 102 operator to improve its radio coverage for inbound roaming. Moreover, it allows host network 102 operator to understand on how each coverage issue affects its inbound roaming revenue so that it can prioritize the cell coverage. Furthermore, it also allows host network 102 operator to understand on how its coverage fares against other competitor networks' cell coverage.

GSM standards enable the discovery of drop-off areas. In case of a drop-off and registration with another network, an HLR in a home network sends a MAP cancel location message to a VLR in the visited network where the subscriber was earlier attached. In this case, the drop-off report provides VLR level information, which usually covers a large area, and thereby, is irrelevant to identify and correct radio gaps. An existing solution provides discovery of drop-off cells and capture by a competitor network by centralizing and correlating data. However, this solution requires a complex technical architecture where different network operators have to share data.

In an embodiment of the present invention, host network 102 operator uses RI module 104 to determine drop-off cells in host network 102 without requiring data sharing between operators. The drop-off cells correspond to cells where inbound roamers are lost. Moreover, RI module 104 helps host network 102 to determine if a competitor network of host network 102 has captured the dropped-off inbound roamer. Location information that includes LAC and CT details is available in two calls event based messages: a CAP IDP and a MAP PSI-ACK. In an embodiment of the present invention, monitoring module 136 monitors the CAP IDP message at host network 102 side in case the inbound roamer from RPN 120 has a CAMEL CSI (e.g., O-CSI, a Visited Terminated CSI (VT-CSI), SMS-CSI etc.) profile provided by HLR-R 132. RI module 104 can create for example such O-CSI and VT-CSI profile dynamically in case HLR-R 132 does not provide such profile feature. In another embodiment of the present invention, monitoring module 136 monitors the MAP PSI-ACK message in case HLR-R 132 requests PSI for the inbound roamer from MSC-H/VLR-H 106. In both these embodiments, RI module 104 extracts the roamer's location information from the monitored message. In an embodiment of the present invention, RI module 104 continuously records the CAP IDP and PSI messages for all inbound roamers of host network 102.

Thereafter, RI module 104 identifies that the inbound roamer is dropped-off from host network 102, when it detects a receipt of a cancel location message for the inbound roamer, without a LUP attempt initiated by the same inbound roamer from another MSC/VLR of host network 102. Further, RI module 104 can apply any of the following two methods to identify the drop-off cells:

1. A passive approach: At each receipt of the cancel location message without the LUP attempt by the inbound roamer, RI module 104 checks whether the inbound roamer has earlier initiated the call event procedure, which includes exchanging CAP IDP interaction or MAP PSI interaction. In an embodiment of the present invention, host network 102 operator configures a time window to consider the dropped-off scenario and the call event procedure. For example, in case the CAP IDP message or the PSI-ACK message for the inbound is received 'X' seconds (i.e., configurable by host network 102 operator) prior to the cancel location message, these call event based messages are recorded to determine the inbound roamer's drop-off cell. In this case, RI module 104 extracts a Cell-ID from the recorded IDP/PSI-ACK, where the extracted Cell-ID indicates the inbound roamer drop-off cell in host network 102. Once a drop-off is detected, RI module 104 uses the techniques described above in the inbound roaming market share section to detect the network that now hosts the dropped-off roamer.

2. An active approach: RI module 104 handles all the mobility management traffic of the inbound roamers. In this active approach, at each receipt of the cancel location message for the inbound roamer from HLR-R 132 without local LUP attempt by the inbound roamer, active signaling module 138 holds the cancel location message to delay its transfer to MSC-H/VLR-H 106. In an embodiment of the present invention, active signaling module 138 issues a MAP PSI message with a paging option or a ping SMS towards the inbound roamer so as to obtain a paging response. Active signaling module 138 then extracts cell id from the obtained paging response. Alternatively, in another embodiment of the present invention, active signaling module 138 issues MAP PSI message to last known MSC-H/VLR-H 106 (i.e., where the inbound roamer is known to be registered). In this case, MSC-H/VLR-If 106 then returns the inbound roamer's current location information and an age of location in the PSI-ACK message to active signaling module 138. The age of location gives an indication in minutes about the obsolescence of the location information. Moreover, it enables RI module 104 to determine the reliability of the location information. MSC-H/VLR-H 106 updates the location information in database 202 when there is an interaction with the inbound roamer (e.g., when the inbound roamer initiates a call or SMS). When the inbound roamer moves on same MSC-H/VLR-H 106, the location information is not recorded, in accordance with an embodiment of the present invention. In one exemplary case, when the age of location is ten minutes, RI module 104 knows that the CI provided is ten minutes old. In this case, RI module 104 may discard this information assuming that the inbound roamer has probably in-between moved to some other CI. However, in another exemplary case, when the age of location is one minute, RI module 104 may store the CI. In an embodiment of the present invention, host network 102 operator configures RI module 104 to either discard or store the CI depending on its requirement. RI module 104 then extracts the Cell-ID from the PSI-ACK message, if the location information is determined reliable, and accordingly updates this information in database 202. Finally, once the cell where drop-off occurred is determined, active signaling module 138 releases the held cancel location message. In other words, active signaling module 138 relays the held cancel location message to last known MSC-H/VLR-H 106.

Inbound Roamer Capture Cells

This KPI aims to identify the cells in host network 102 where inbound roamers attach to host network 102. In other words, host network 102 operator determines good coverage area for its inbound roamers. In this case, RI module 104 captures location information of inbound roamers arriving at host network 102 from another network (i.e., local network, foreign network or home network). In such context, the objective of this KPI is to determine at a cell-ID level, the most important capture area in host network 102 operator. Host network 102 operator can determine the capture cells per inbound roamer type, per inbound roamer usage, per home network operator of the inbound roamer, per network operator group, or based on inbound roamer-'s device (e.g., blackberry, 3G etc.). This KPI further allows host network 102 operator to understand how each good coverage impacts its inbound roaming revenue, and how its coverage fares against its competitor networks, so as to allow host network 102 operator to prioritize its cell coverage (e.g., at airport, casino, etc.). Moreover, this KPI allows host network 102 operator to understand at which location inbound roamers are captured (e.g., at casino).

Firstly, RI module 104 identifies inbound roamers that are attempting to register with host network 102 for the first time. This identification is achieved by monitoring LUP transaction (using monitoring module 136) of the inbound roamer at host network 102 when arriving from another network. In other words, the inbound roamers whose home HLRs do not issue any cancel location message to a MSC/VLR in host network 102 are identified.

Once the roamer is identified, RI module 104 applies passive and active approaches to identify the cell-ID. In an embodiment of the present invention, host network 102 configures RI module 104 to first apply the passive approach during host network 102 operator's defined time duration, and then, if required, acts actively to identify the cell-ID. In the passive approach, monitoring module 136 passively detects the CAP IDP message or MAP PSI-ACK message for the inbound roamer within host network 102 operator's defined time duration. Once RI module 104 detects that the inbound roamer satisfies the "first time registration" condition, it awaits host network 102 operator's defined time delay (e.g., 30-to-60 seconds) for detecting the IDP/PSI-ACK message for the inbound roamer. Upon detecting receipt of the IDP message or PSI-ACK message at monitoring module 136, RI module 104 obtains the cell-ID from the monitored message. If no CAP IDP message or MAP PSI-ACK message is detected even after expiration of host network 102 operator's defined time delay, RI module 104 applies the active approach. In active approach, in a first embodiment of the present invention, active signaling module 138 issues a MAP PSI message to a current VLR location of the inbound roamer so as to obtain the inbound roamer's cell ID in host network 102. Alternatively, in a second embodiment of the present invention, active signaling module 138 issues MAP PSI message with paging option or ping SMS towards the inbound roamer so as to obtain paging response. Active signaling module 138 then extracts cell id from the obtained paging response.

Alternatively, in another embodiment of the present invention, RI module 104 directly applies the active approach (without applying passive approach) after detecting the inbound roamer LUP attempt at host network 102 for the first time. In this case, host network 102 operator sets the time delay timer to zero second in order to issue the MAP PSI message to the inbound roamer's VLR location as soon as the inbound roamer attaches to host network 102 for the first time.

Inbound Roamer Recapture Cells

This KPI is a combination of the two previous mechanisms i.e., inbound roamer drop-off cells and inbound roamer capture cells. This KPI aims at determining the cell where the inbound roamer is lost from host network 102, and then later captured by host network 102 during host network 102 operator's defined time window.

Inbound Roaming Activity Cells

The objective of this KPI is to identify cells in host network 102 where the inbound roaming activity is most intensive. It enables host network 102 operator to identify inbound roaming revenue generating events (e.g., a trade fair), identify the reason of an unplanned revenue peak, and secure its network for any future event editions. Like determination of inbound roamer drop-off cells, monitoring module 136 monitors the CAP IDP message at host network 102 side in case the inbound roamer from RPN 120 has CAMEL O-CSI or CAMEL VT-CSI profile provided by HLR-R 132 so as to determine the cells with maximum inbound roaming activities. Moreover, monitoring module 136 monitors the MAP PSI-ACK message in case HLR-R 132 requests PSI for the inbound roamer from MSC-H/VLR-H 106. RI module 104 then extracts the inbound roamer's location information from the monitored message. In an embodiment of the present invention, RI module 104 records the IDP/PSI-ACK message to identify cells in host network 102 where the peak mobile activity occurs. Thereafter, depending upon host network 102 operator's needs, active signaling module 138 issues the PSI message to MSC-H/VLR-H 106 location of the inbound roamer, subsequent to completion of a mobile activity (e.g. end of a voice call) by the inbound roamer. This allows host network 102 operator to determine whether the cell activity is mainly coming from moving roamers or static roamers.

Inbound Roaming Agreements Prioritization

The ability to determine the International Roaming Agreements prioritization is set at two levels—GSM or GPRS level, and service technology level (CAMEL). It assists decision makers in setting-up a priority list for roaming agreements. This KPI helps host network 102 operator to generate a priority list of host network 102's desired roaming agreements with the non-host networks using following two levels:

1. GSM/GPRS level: Host network 102 operator needs to route the LUP transactions for the inbound roamers of unknown non-host networks (i.e., non-RPN, hereinafter referred to as unknown home networks of inbound roamers) via RI module 104. In an embodiment of the present invention, host network 102 operator configures STP-H 114 to direct all LUP transactions by the inbound roamers of the unknown home networks (hereinafter referred to as unknown inbound roamers) at host network 102 to active signaling module 138. In an embodiment of the present invention, RI module 104 maintains a blacklist of the unknown home networks in database 202. Upon detecting registration attempts by unknown inbound roamers at host network 102, active signaling module 138 rejects all received LUP attempts by responding with an error 'Roaming Not Allowed (RNA)' to MSC/VLR locations of the unknown inbound roamers in host network 102. Thereafter, RIS 200 generates a report for number of registration attempt rejections for each of the unknown home network within a specified time period (i.e., defined by host network 102 operator). This report helps host network 102 operator to get the list of recurring home networks that send these requests. In an embodiment of the present invention, RI module 104 counts the number of voice (i.e., 2G, 3G and CAMEL combined together) registration attempt rejections and GPRS registration attempt rejections, based on the corresponding LUP transactions (i.e., LUP for non-GPRS and GPRS-LUP for GPRS). This eventually helps host network 102 operator to generate the priority list of the desired GSM and GPRS roaming agreements between host network 102 and unknown home networks.

2. Service technology level—CAMEL: Generally, the CAMEL roamers are identified when the presence of CSI profile in an ISD operation is detected. Since a home network HLR controls the profile of a roamer, determination of the roamer as a CAMEL roamer using this above presented technique is not completely reliable.

As mentioned above, RIS 200 can be shared between host network 102 and the client networks that together form an ecosystem of networks. In a first embodiment of the present invention, in case of an ecosystem of networks, RI module 104 uses cross-analysis between the networks in the ecosystem and considers presence of CAMEL profile support for a specific non-host network (i.e., HPMN of inbound roamers). For example, for such specific HPMN, a client network C1 receives 70 percent of CAMEL-enabled inbound roamers, whereas a client network C2 receives no CAMEL-enabled inbound roamers. Therefore, RI module 104 determines an opportunity to open a CAMEL agreement between the HPMN and the client network C2. In other words, RI module 104 generates a priority list of the desired CAMEL roaming agreements between a set of networks in the ecosystem and the HPMN, when at least one network in the ecosystem is detected to receive CAMEL-enabled inbound roamers from the HPMN, while the other networks from the set lack the CAMEL profile support with the HPMN.

In a second embodiment of the present invention, host network 102 operator configures STP-H 114 to direct all signaling messages of the inbound roamers, destined to one or more non-CAMEL enabled networks (hereinafter referred to as non-CAMEL home networks), to active signaling module 138. Such inbound roamers are hereinafter interchangeably referred to as non-CAMEL inbound roamers. Upon receiving a LUP message from the non-CAMEL inbound roamer at host network 102, active signaling module 138 holds the received LUP message. Thereafter, RI module 104 adds CAMEL parameters in the received LUP message, prior to relaying it to an HLR in the non-CAMEL home network. RI module 104 then observes the HLR behavior. In case the inbound roamer is enabled by the HLR, RI module 104 observes a positive response from the HLR indicating that the non-CAMEL inbound roamer is enabled by the HLR. RI module 104 then rejects the registration attempt of the non-CAMEL, inbound roamer that is enabled by the HLR, and subsequently re-sends an LUP message without CAMEL parameters for the rejected non-CAMEL inbound roamer to the HLR. Further, upon detecting an ISD message with no CAMEL profile information for the rejected non-CAMEL inbound roamer from the HLR at active signaling module 138, active signaling module 138 relays the ISD message to an MSC/VLR location of the rejected non-CAMEL inbound roamer, in order to facilitate registration of the rejected non-CAMEL inbound roamer with host network 102. RI module 104 then repeats the checking procedure of the HLR behavior for other non-CAMEL inbound roamers. RI module 104 counts the number of positive responses from the HLRs, and based on this count, creates the priority list of the desired CAMEL roaming agreements between the non-CAMEL home networks and host network 102.

Alternatively, in case the HLR does not add a CAMEL profile for the non-CAMEL inbound roamer (i.e., a negative response) in the ISD operation received at active signaling module 138, active signaling module 138 relays the ISD operation to a MSC/VLR location of the non-CAMEL inbound roamer so as to facilitate registration of such roamer with host network 102. RI module 104 then repeats the checking procedure of the HLR behavior for other non-CAMEL inbound roamers. RI module 104 counts the number of negative responses from the HLRs.

Active Roamer and Passive Roamer Identification

This KPI enables host network 102 operator to identify a list of inactive roamers of host network 102 operator to better understand customer behavior so as to build up new offers to cause such inactive roamers to initiate roaming activities. In an embodiment of the present invention, RI module 104 determines the inactive roamer in host network 102 or in the non-host network by determining absence of any mobile activity by the roamer. In this case, the basis for inactive roamer classification is determined by presence of LUP, MT call or MT SMS events, but absence of MO activities (e.g., MO calls or SMS) by the roamer when roaming in any foreign country or network. In another embodiment of the present invention, RI module 104 determines the inactive roamer in host network 102 or in the non-host network by determining a limited number of MO calls or SMS by the roamer for a pre-defined time period (i.e., configurable by host network 102 operator). For example, host network 102 operator can configure RI module 104 to conclude the roamer as inactive when one MO Call and 2 MO SMS by the roamer is determined after two days monitoring of MO activities by the roamer in host network 102 or any other non-host network.

Detection of any of the following at monitoring module 136 helps host network 102 operator to determine active roamers in host network 102 or any other non-host network:

- MO calls (includes normal MO calls and CAMEL MO calls) by the roamer. In this case, monitoring module 136 monitors ISUP calls by the inbound roamer in host network 102 since RI module 104 can identify the inbound roamer using his MSISDN.
- In MAP v1/v2, a MAP-Forward Short Message (Submit operation for MO) indicates an MO SMS by the roamer. Similarly, in MAP v3, a MAP-MO-Forward-SM indicates the MO SMS by the roamer.
- A roaming number request message such as a PRN message on the roamer indicates an MT call to the roamer.
- In MAP v1/v2, a MAP-Forward Short Message (Deliver in MT) indicates an MT SMS by the roamer. Similarly, in MAP v3, a MAP-MT-Forward-SM indicates the MT SMS by the roamer.
- A Protocol Data Packet (PDP)-Context creation message such as a GTP-Create-PDP-Context message indicates a GPRS activity by the roamer.
- The CAP IDP messages initiated by either CAMEL outbound roamers or CAMEL inbound roamers of host network 102, when they initiate calls, SMS or GPRS sessions controlled by a CAMEL service.

In accordance with various embodiments of the present invention, RIS 200 is integrated with SoR systems, and a tariff simulator and Outreach, because RIS 200 is a combined active and passive solution that monitors one or more signaling messages (e.g., LUP, ISD etc.). Moreover, RIS 200 can also be an information source to these platforms that can provide information such as, but not limited to:

- Change a SoR policy automatically, upon reaching inbound roaming market share threshold or outbound roaming market share threshold,
- Provide information for simulating 10T forecasts based on market share situation, and
- Trigger a marketing SMS when a roamer is flagged as inactive.

A host network operator uses one or more variations of the present invention to determine and manage roaming arrangement of its network with other non-host networks. Thus, the host network operator is able to understand market trend for inbound and outbound roaming, non-lost networks with which the host network needs to establish new roaming agreements in order to increase the host network's roaming revenues. Moreover, the host network is able to identify networks that apply SoR techniques to steer their roaming traffic either in favor or against the host network. Overall, the host network operator is able to determine business and technical indicators that help estimate its roaming market distribution. Additionally, the present invention can be deployed at a central location by a group of networks forming an ecosystem, thereby reducing implementation costs and efforts.

The present invention can take the form of an entirely hardware embodiment, an entirely software embodiment, or an embodiment containing both hardware and software elements. In accordance with an embodiment of the present invention, the invention is implemented in software, which includes but is not limited to firmware, resident software, microcode, etc.

Furthermore, the invention can take the form of a computer program product, accessible from a computer-usable or computer-readable medium, providing program code for use by, or in connection with, a computer or any instruction execution system. For the purposes of this description, a computer-usable or computer readable medium can be any apparatus that can contain, store, communicate, propagate, or transport the program for use by, or in connection with, the instruction execution system, apparatus, or device.

The medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk-read only memory (CDROM), compact disk-read/write (CD-R/W), and Digital Versatile Disk (DVD).

A computer usable medium provided herein includes a computer usable program code, which when executed, facilitates roaming management of a host network's inbound and outbound roamers. In order to do so, the host network operator uses a gateway to obtain signaling messages of inbound roamers or outbound roamers of the host network. The computer program product further includes a computer usable program code for determining by the gateway, the host network's roaming arrangement with the non-host networks, based on analysis of one or more signaling messages from the obtained signaling messages.

The components of the present system described above include any combination of computing components and devices operating together. The components of the present system can also be components or subsystems within a larger computer system or network. The present system components can also be coupled with any number of other components (not shown), for example, other buses, controllers, memory devices, and data input/output devices, in any number of combinations. In addition, any number or combination of other processor-based components may be carrying out the functions of the present system.

It should be noted that the various components disclosed herein may be described using computer aided design tools, and/or expressed (or represented) as data and/or instructions, embodied in various computer-readable media, in terms of their behavioral, register transfer, logic component, transistor, layout geometries, and/or other characteristics. Computer-readable media, in which such formatted data and/or instructions may be embodied, include, but are not limited to, nonvolatile storage media in various forms (e.g., optical, magnetic or semiconductor storage media) and carrier waves that may be used to transfer such formatted data and/or instructions through wireless, optical, or wired signaling media or any combination thereof.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole, and not to any particular portions of this application. When the word "or" is used in reference to a list of two or more items, that word covers all of the following interpretations of the word: any of the items in the list, all of the items in the list, and any combination of the items in the list.

The above description of illustrated embodiments of the present system is not intended to be exhaustive or to limit the system to the precise form disclosed. While specific embodiments of, and examples for, the present system are described herein for illustrative purposes, various equivalent modifications are possible within the scope of the present system, as those skilled in the art will recognize. The teachings of the present system provided herein can be applied to other processing systems and methods. They may not be limited to the systems and methods described above.

The elements and acts of the various embodiments described above can be combined to provide further embodiments. These and other changes can be made in light of the above detailed description.

Other Variations

Provided above for the edification of those of ordinary skill in the art, and not as a limitation on the scope of the invention, are detailed illustrations of a scheme for facilitating roaming management of inbound and outbound roamers of a host network. Numerous variations and modifications within the spirit of the present invention will of course occur to those of ordinary skill in the art in view of the embodiments that have been disclosed. For example, the present invention is implemented primarily from the point of view of GSM mobile networks as described in the embodiments. However, the present invention may also be effectively implemented on GPRS, 3G, CDMA, WCDMA, WiMax etc., or any other network of common carrier telecommunications in which end users are normally configured to operate within a "home" network to which they normally subscribe, but have the capability of also operating on other neighboring networks, which may even be across international borders.

The examples under the system of the present invention detailed in the illustrative examples contained herein are described using terms and constructs drawn largely from GSM mobile telephony infrastructure. However, use of these examples should not be interpreted as limiting the invention to those media. The system and method can be of use and provided through any type of telecommunications medium, including without limitation: (i) any mobile telephony network including without limitation GSM, 3GSM, 3G, CDMA, Wimax, VoIP, HSDPA, SIP, IMS, WCDMA or GPRS, satellite phones or other mobile telephone networks or systems; (ii) any so-called WiFi apparatus normally used in a home or subscribed network, but also configured for use on a visited or non-home or non-accustomed network, including apparatus not dedicated to telecommunications such as personal computers, Palm-type or Windows Mobile devices; (iii) an entertainment console platform such as Sony Playstation, PSP or other apparatus that are capable of sending and receiving telecommunications over home or non-home networks, or even (iv) fixed-line devices made for receiving communications, but capable of deployment in numerous locations while preserving a persistent subscriber id such as the eye2eye devices from Dlink; or telecommunications equipment meant for voice over IP communications such as those provided by Vonage or Packet8.

In describing certain embodiments of the system under the present invention, this specification follows the path of a telecommunications call, from a calling party to a called party. For the avoidance of doubt, such a call can be a normal voice call, in which the subscriber telecommunications equipment is also capable of visual, audiovisual or motion-picture display. Alternatively, those devices or calls can be for text, video, pictures or other communicated data.

In the foregoing specification, specific embodiments of the present invention have been described. However, one of ordinary skill in the art will appreciate that various modifications and changes can be made without departing from the scope of the present invention as set forth in the claims below. Accordingly, the specification and the figures are to be regarded in an illustrative rather than a restrictive sense, and all such modifications are intended to be included within the scope of present invention. The benefits, advantages, solutions to problems, and any element(s) that may cause any benefit, advantage, or solution to occur, or to become more pronounced, are not to be construed as a critical, required, or essential feature or element of any or all of the claims.

APPENDIX

| Acronym | Description |
| --- | --- |
| 2G | Second Generation of mobile |
| 3G | Third Generation of mobile |
| ATI | Any Time Interrogation |
| CAMEL | Customized Application for Mobile Enhanced Logic |
| CAP | Camel Application Part |
| CC | Country Code |
| CdPA | Called Party Address |
| CgPA | Calling Party Address |
| CI | Cell-ID |
| CIC | Circuit Identification Code |
| CSI | Camel Subscription Information |
| GGSN | Gateway GPRS Support Node |
| GGSN-H | Host network GGSN |
| GGSN-R | Roaming Partner Network GGSN |
| GMSC | Gateway MSC |
| GMSC-H | GMSC in host network |
| GMSC-R | GMSC in Roaming Partner Network |
| GPRS | General Packet Radio Services |
| GSM | Global System for Mobile communication |
| GSMA | GSM Association |
| GT | Global Title |
| GTP | GPRS Tunnel Protocol |
| HLR | Home Location Register |
| HLR-H | HLR in host network |
| HLR-R | HLR in Roaming Partner Network |
| HPMN | Home Public Mobile Network |
| IDP | Initial DP IN/CAP message |
| IMEI | International Mobile Equipment Identity |
| IMSI | International Mobile Subscriber Identity |
| IMSI-R | Roaming Partner Network IMSI |
| INAP | Intelligent Network Application Part |
| IOT | Inter-Operator Tariff |
| IP | Internet Protocol |
| ISD | MAP Insert Subscriber Data |
| ISUP | ISDN User Part |
| KPI | Key Performance Indicators |
| LAC | Local Area Code |
| LUP | Location Update |
| MAP | Mobile Application Part |
| MCC | Mobile Country Code |
| MNC | Mobile Network Code |
| MO | Mobile Originated |
| MSC | Mobile Switching Center |
| MSISDN | Mobile Station International Subscriber Directory Number |
| MSISDN-R | Roaming Partner Network MSISDN |
| MSRN | Mobile Station Roaming Number |
| MT | Mobile Terminated |
| NDC | National Dialing Code |
| NRTRDE | Near Real Time Roaming Data Exchange |
| O-CSI | Originating CSI |
| ODB | Operator Determined Barring |
| OR | Optimal Routing |
| PC | Point Code |
| PDP | Protocol Data Packet |
| PRN | MAP Provide Roaming Number |
| PSI | MAP Provide Subscriber Information |
| RAEX | Roaming Agreement Electronic Exchange |
| RNA | Roaming Not Allowed |

APPENDIX-continued

| Acronym | Description |
|---|---|
| SC | Short Code |
| SCCP | Signal Connection Control part |
| SG | Signaling Gateway |
| SGSN | Serving GPRS Support Node |
| SGSN-H | Host network SGSN |
| SGSN-R | Roaming Partner Network SGSN |
| SIM | Subscriber Identity Module |
| SMS | Short Message Service |
| SMSC | Short Message Service Center |
| SMSC-H | Host network SMSC |
| SMSC-R | Roaming Partner Network SMSC |
| SoR | Steering of Roaming |
| SRI | MAP Send Routing Information |
| SRI-SM | MAP Send Routing Information For Short Message |
| SS7 | Signaling System #7 |
| SSN | Sub System Number |
| STP | Signal Transfer Point |
| STP-H | Host network STP |
| STP-R | Roaming Partner Network STP |
| TCAP | Transaction Capabilities Application Part |
| TIMSI | Temporary IMSI |
| VLR | Visitor Location Register |
| VoIP | Voice over IP |
| VPMN | Visited Public Mobile Network |
| VT-CSI | Visited Terminated CAMEL Service Information |

TECHNICAL REFERENCES, EACH OF WHICH IS INCORPORATED BY REFERENCE HEREIN:

GSM 902 on MAP specification
Digital cellular telecommunications system (Phase 2+);
Mobile Application Part (MAP) Specification
(3GPP TS 09.02 version 7.9.0 Release 1998)
GSM 378 CAMEL Architecture, Release 1998
GSM 978 CAMEL Application Protocol, Release 1998
GSM 340 on SMS
Digital cellular telecommunications system (Phase 2+);
Technical realization of the Short Message Service (SMS);
(GSM 03.40 version 7.4.0 Release 1998)
Q1214-Q1218 on Intelligent Networks
Q701-704 on SS7 MTP
Q711-Q714 on SS7 SCCP
ETS 300 374-1 Intelligent Network (IN); Intelligent Network Capability Set 1 (CSI); Core Intelligent Network Application Protocol (INAP); Part 1: Protocol specification
EN 301 140-1 Intelligent Network (IN); Intelligent Network Application Protocol (INAP); Capability Set 2 (CS2); Part 1: Protocol specification
John Jiang [PI 2007] A single operator and network side solution for inbound and outbound roaming tests and discoveries of roaming partner services and frauds without involving remote probes or real roamer traffic—Phase 1
GSM 379 on CAMEL Support of Optimal Routing (SOR)
GSM 318 Basic Call Handling
GSM 23018 Basic Call Handling
GSM 23081 Line identification service
GSM 23116 Super Charger Function
ITU-T Recommendation Q.1214 (1995), Distributed functional plane for intelligent network CS-1;
ITU-T Recommendation Q.1218 (1995), Interface Recommendation for intelligent network CS-1;
ITU-T Recommendation Q.762 (1999), Signaling system No. 7—ISDN user part general functions of messages and signals;
ITU-T Recommendation Q.763 (1999), Signaling system No. 7—ISDN user part formats and codes;
ITU-T Recommendation Q.764 (1999), Signaling system No. 7—ISDN user part signaling procedures;
ITU-T Recommendation Q.766 (1993), Performance objectives in the integrated services digital network application;
ITU-T Recommendation Q.765 (1998), Signaling system No. 7—Application transport mechanism;
ITU-T Recommendation Q.769.1 (1999), Signaling system No. 7—ISDN user part enhancements for the support of Number Portability
BA 19 GSMA RAEX on AA 14 and IR 21
IR.71 SMS SS7 Fraud Prevention
Textbook 'Statistics for Management and Economics', Keller & Warrack, Brooks/Cole—Thomson Learning
E. Ciesielski, Orange SA, WO 2006/058586 A1, titled "Method of determining a relative distribution of inbound roaming mobile subscribers between plural mobile networks, and corresponding analyser and telecommunications system"

What is claimed is:

1. A method for determining a roaming arrangement of a host network with a non-host network, the host network having an associated gateway and a roaming agreement with a home network, wherein multiple sets of home network subscribers are located in the host network and the non-host network, the method comprising:

obtaining, via the associated gateway, signaling messages of one or more roamers, wherein the one or more roamers comprise failed-to-register roamers or registered roamers, each roamer being a subscriber of the multiple sets of subscribers, wherein obtaining the signaling messages comprises passive monitoring and active inward and outward interfacing at the associated gateway; and determining, via the associated gateway, the host network's roaming arrangement with the non-host network, based on an analysis of one or more additional signaling messages from the obtained signaling messages, wherein the host network is different from a home network of the one or more roamers, and the host network does not have a roaming agreement with the non-host network, wherein determining the host network's roaming arrangement comprises determining an inbound roaming market share of the host network, and wherein determining an inbound roaming market share of the host network comprises:

calculating, via the associated gateway, a number of samples necessary for determining the inbound roaming market share;

selecting, via the associated gateway, the roamers of the one or more roamers that have earlier roamed in the host network, wherein a number of the selected roamers is equal to the calculated number of samples;

obtaining, through a polling via the associated gateway to a home location register (HLR) associated with the selected roamer's home network, current locations of the selected roamers from the obtained signaling messages;

determining, via the associated gateway, a distribution of the selected roamers across different operators within the host network's country, wherein the determination is based on the obtained locations;

issuing, via the associated gateway, a blank Short Message Service (SMS) to each of the selected roamers when the obtained current location of the selected roamer indicates the selected roamer's home network location such that the home network of the selected roamer does not identify the polling, in connection with obtaining the current locations, as an SMS faking procedure; and issuing, via the associated gateway, at least one of: a routing request for a short message, a routing request for a short message with General Packet Radio Services (GPRS) support indication, an interrogation message, a routing request message and a routing request message for GPrs to the HLR, wherein the selected roamer's home network is the non-host network.

2. The method of claim 1, the associated gateway having an associated database, the method further comprising:

in the associated database, storing at least one of: International Mobile Subscriber Identities (IMSIs) correspondingly associated with the one or more roamers, Mobile Station International Subscriber Directory Numbers (MSISDNs) correspondingly associated with the one or more roamers, Mobile Station Roaming Numbers (MSRNs) correspondingly associated with the one or more roamers, locations of the one or more roamers, international and national interconnect information, protocol data, or one or more unknown non-host networks in a blacklist.

3. The method of claim 2, wherein the protocol data enables processing, combining and correlating different signaling information based on at least one of: a time window between events, network information, one or more Signaling Connection Control Part (SCCP) addresses, Mobile Application Part (MAP) information, CAMEL Application Part (CAP) information, ISDN User Part Protocol (ISUP) information, profile information of the one or more roamers, IMSIs of the one or more roamers, Temporary IMSIs (TIMSIs) of the one or more roamers, Mobile Station International Subscriber Directory Numbers (MSISDNs) of the one or more roamers, and International Mobile Equipment Identities (IMEIs) of the one or more roamers.

4. The method of claim 1, wherein the roaming arrangement further comprises at least one of:

determining an outbound roaming market share of the host network, determining an inbound roamer drop-off cells in the host network, determining an inbound roaming activity cells in the host network, determining an inbound roamer capture cells in the host network, determining an inbound roamer re-capture cells in the host network, or determining one or more desired roaming agreements with the non-host network.

5. The method of claim 1, wherein determining the distribution of the selected roamers further comprises:

determining an average stay period of each of the selected roamers at the host network; and determining an average stay period of each of the selected roamers at the non-host network within the host network's country.

6. The method of claim 5, wherein determining the average stay period of each of the selected roamers at the non-host network further comprises:

polling the HLR to obtain each of the selected roamers' current location, wherein the HLR is polled at a pre-defined frequency and for a pre-defined duration.

7. The method of claim 5, wherein determining the average stay period of each of the selected roamers at the host network further comprises:

determining a time difference between a registration message and a registration cancellation message for each of the selected roamers at the host network.

8. The method of claim 1, each of the selected roamers having a type, wherein the distribution of the selected roamers is determined based on the type.

9. A system for determining a roaming agreement of a host network, with a non-host network, the host network having an associated gateway and a roaming agreement with a home network, wherein multiple sets of home network subscribers, are located in the host network and the non-host network, the system comprising:

an obtaining module for obtaining, via the associated gateway, signaling messages of one or more roamers, wherein the one or more roamers comprise failed-to-register roamers or registered roamers, each roamer being a subscriber of the multiple set of subscribers, and wherein obtaining the signaling messages comprises passive monitoring and active inward and outward interfacing at the associated gateway; and a determining module for determining, via the associated gateway, the host network's roaming arrangement with non-host network, based on an analysis of one or more additional signaling messages from the obtained signaling messages, wherein the host network is different from a home network of the one or more roamers, and the host network does not have a roaming agreement with the non-host network, wherein the determining module is further configured to determine an inbound roaming market share of the host network, and wherein the determination of the inbound roaming market share of the host network comprises:

calculating, via the associated gateway, a number of samples necessary for determining the inbound roaming market share;

selecting, via the associated gateway, the roamers of the one or more roamers that have earlier roamed in the host network, wherein a number of the selected roamers is equal to the calculated number of samples;

obtaining, through a polling via the associated gateway to a home location register (HLR) associated with the selected roamer's home network, current locations of the selected roamers from the obtained signaling messages;

determining, via the associated gateway, a distribution of the selected roamers across different operators within the host network's country, wherein the determination is based on the obtained location;

issuing, via the associated gateway, a blank Short Message Service (SMS) to each of the selected roamers when the obtained current location of the selected roamer indicates the selected roamer's home network location such that the home network of the selected roamer does not identify the polling, in connection with obtaining the current locations, as an SMS faking procedure; and issuing, via the associated gateway, at least one of: a routing request for a short message, a routing request for a short message with General Packet Radio Services (GPRS) support indication, an interrogation message, a routing request message and a routing request message for GPRS to the HLR, wherein the selected roamer's home network is the non-host network.

10. A computer program product comprising a non-transitory computer readable medium having control logic stored therein for causing a processor of a computer to determine a roaming agreement of a host network, with a non-host network, the host network having an associated gateway and a roaming arrangement with a home network, wherein multiple sets of home network subscribers, are located in the host network and the non-host network, the control logic comprising:

- a first set of code for obtaining, via the associated gateway, signaling messages of one or more roamers, wherein the one or more roamer comprise failed-to-register roamers, each roamer being a subscriber of the multiple set of subscribers, wherein obtaining the signaling messages comprises passive monitoring and active inward and outward interfacing at the associated gateway; and
- a second set of code for determining, via the associated gateway, the host network's roaming arrangement with non-host network, based on an analysis of one or more additional signaling messages from the obtained signaling messages,
- wherein the host network is different from a home network of the one or more roamers, and the host network does not have a roaming agreement with the non-host network,
- wherein determining the host network's roaming arrangement comprises determining an inbound roaming market share of the host network, and
- wherein determining an inbound roaming market share of the host network comprises:
  - calculating, via the associated gateway, a number of samples necessary for determining the inbound roaming market share;
  - selecting, via the associated gateway, the roamers of the one or more roamers that have earlier roamed in the host network, wherein a number of the selected roamers is equal to the calculated number of samples;
  - obtaining, through a polling via the associated gateway to a home location register (HLR) associated with the selected subscriber's home network, current locations of the selected roamers from the obtained signaling messages;
  - determining, via the associated gateway, a distribution of the selected roamers across different operators within the host network's country, wherein the determination is based on the obtained locations;
  - issuing, via the associated gateway, a blank Short Message Service (SMS) to each of the selected roamers when the obtained current location of the selected roamer indicates the selected roamer's home network location such that the home network of the selected roamer does not identify the polling, in connection with obtaining the current locations, as an SMS faking procedure; and
  - issuing, via the associated gateway, at least one of: a routing request for a short message, a routing request for a short message with General Packet Radio Services (GPRS) support indication, an interrogation message, a routing request message and a routing request message for GPRS to the HLR, wherein the selected roamers' home network is the non-host network.

11. The method of claim 1, wherein active interfacing comprises issuing signaling messages.

12. The method of claim 1, further comprising:
establishing one or more roaming agreements between the host network and the non-host network based upon the host network's roaming arrangement with the non-host network.

13. The method of claim 1, wherein the host network has at least one roaming agreement with the home network.

* * * * *